(12) United States Patent
White et al.

(10) Patent No.: US 12,018,114 B2
(45) Date of Patent: Jun. 25, 2024

(54) POLYMERIC MATERIAL INCLUDING A URETDIONE-CONTAINING MATERIAL AND A THERMALLY ACTIVATABLE AMINE, TWO-PART COMPOSITIONS, AND METHODS

(71) Applicant: 3M INNOVATIVE PROPERTIES COMPANY, St. Paul, MN (US)

(72) Inventors: Kolby L. White, Woodbury, MN (US); Matthew J. Kryger, Hudson, WI (US); Joseph D. Rule, Woodbury, MN (US); Michael A Kropp, Cottage Grove, MN (US); Adrian T. Jung, Kaarst (DE)

(73) Assignee: 3M Innovative Properties Company, St. Paul, MN (US)

( * ) Notice: Subject to any disclaimer, the term of this patent is extended or adjusted under 35 U.S.C. 154(b) by 562 days.

(21) Appl. No.: 17/265,049

(22) PCT Filed: Sep. 19, 2019

(86) PCT No.: PCT/IB2019/057938
§ 371 (c)(1),
(2) Date: Feb. 1, 2021

(87) PCT Pub. No.: WO2020/065466
PCT Pub. Date: Apr. 2, 2020

(65) Prior Publication Data
US 2021/0317252 A1    Oct. 14, 2021

Related U.S. Application Data

(60) Provisional application No. 62/820,423, filed on Mar. 19, 2019, provisional application No. 62/736,273, filed on Sep. 25, 2018.

(51) Int. Cl.
*C08G 18/22* (2006.01)
*B32B 7/12* (2006.01)
(Continued)

(52) U.S. Cl.
CPC .............. *C08G 18/227* (2013.01); *B32B 7/12* (2013.01); *B32B 37/12* (2013.01); *C08G 18/2825* (2013.01); *C08G 18/3206* (2013.01); *C08G 18/3218* (2013.01); *C08G 18/3253* (2013.01); *C08G 18/4238* (2013.01);
(Continued)

(58) Field of Classification Search
CPC .............. C08G 18/227; C08G 18/2825; C08G 18/3206; C08G 18/3218; C08G 18/3253; C08G 18/4238; C08G 18/4854; C08G 18/5024; C08G 18/7831; C08G 18/798; C08G 18/8038; C08G 59/4021; C08G 59/5013; C08G 2190/00; B32B 7/12; B32B 37/12; B32B 2037/1269; C09D 175/12; C09J 175/12; C09J 163/00
See application file for complete search history.

(56) References Cited

U.S. PATENT DOCUMENTS 3,496,250 A    2/1970   Czerwinski
4,044,171 A    8/1977   Muller
(Continued)

FOREIGN PATENT DOCUMENTS

CN    105086420    11/2015
CN    106494064    3/2017
(Continued)

OTHER PUBLICATIONS

"Curing Agents for Epoxy Resin," ThreeBond (TM) Technical News, Dec. 20, 1990, p. 3 (Three Bond Co, LTD, Tokyo, Japan). (Year: 1990).*
Carothers, "Polymers and Polyfunctionality", Transactions of The Faraday Society, 1936, vol. 32, pp. 39-49.
Chandalia, "New Non-Isocyanate Curatives for 2K Solvent-Borne Urethane Coatings", Proceedings of The Twenty-Eighth International Waterborne, High-Solids, and Powder Coatings Symposium, 2001, pp. 77-89.
(Continued)

Primary Examiner — Cynthia L Schaller
(74) Attorney, Agent, or Firm — Adrian L. Pishko

(57) ABSTRACT

The present disclosure provides a polymeric material including a polymerized reaction product of a polymerizable composition including components, and a thermally activatable amine curative, and has a solids content of 90% or greater. The components include a uretdione-containing material including a reaction product of a diisocyanate reacted with itself; a first hydroxyl-containing compound; and an optional second hydroxyl-containing compound having a single OH group. The first hydroxyl-containing compound has more than one OH group and the optional second hydroxyl-containing compound is a primary alcohol or a secondary alcohol. The present disclosure also provides a two-part composition, in which a polymeric material is included in the first part and the second part includes at least one liquid amine. Further, a method of adhering two substrates is provided, including obtaining a two-part composition; combining at least a portion of the first part with at least a portion of the second part to form a mixture; disposing at least a portion of the mixture on a first substrate; and contacting a second substrate with the mixture disposed on the first substrate. The disclosure also provides a polymeric material and a method of curing a two-part composition. Advantageously, two-part compositions according to the present disclosure can be used as coatings and adhesive systems having a two-step cure with handling and performance similar to existing two-part urethane systems, but with less sensitivity to water.

16 Claims, 2 Drawing Sheets

(51) Int. Cl.
*B32B 37/12* (2006.01)
*C08G 18/28* (2006.01)
*C08G 18/32* (2006.01)
*C08G 18/42* (2006.01)
*C08G 18/48* (2006.01)
*C08G 18/50* (2006.01)
*C08G 18/78* (2006.01)
*C08G 18/79* (2006.01)
*C08G 18/80* (2006.01)
*C08G 59/40* (2006.01)
*C08G 59/50* (2006.01)
*C09D 175/12* (2006.01)
*C09J 175/12* (2006.01)

(52) U.S. Cl.
CPC ..... *C08G 18/4854* (2013.01); *C08G 18/5024* (2013.01); *C08G 18/7831* (2013.01); *C08G 18/798* (2013.01); *C08G 18/8038* (2013.01); *C08G 59/4021* (2013.01); *C08G 59/5013* (2013.01); *C09D 175/12* (2013.01); *C09J 175/12* (2013.01); *B32B 2037/1269* (2013.01); *C08G 2190/00* (2013.01)

(56) References Cited

U.S. PATENT DOCUMENTS

| | | | |
|---|---|---|---|
| 4,218,543 A * | 8/1980 | Weber | C08G 18/3237 264/DIG. 83 |
| 4,546,155 A | 10/1985 | Hirose | |
| 4,786,655 A | 11/1988 | Grögler | |
| 5,077,376 A | 12/1991 | Dooley | |
| 5,134,216 A * | 7/1992 | Jansen | C08G 18/3271 528/68 |
| 5,354,834 A | 10/1994 | Yoshida | |
| 5,596,066 A | 1/1997 | Laas | |
| 5,795,950 A | 8/1998 | Sugimoto | |
| 5,814,689 A | 9/1998 | Goldstein | |
| 5,861,193 A | 1/1999 | Goldstein | |
| 6,653,371 B1 | 11/2003 | Burns | |
| 7,960,495 B2 | 6/2011 | Barancyk et al. | |
| 8,293,836 B2 | 10/2012 | Cranfill | |
| 8,829,146 B2 | 9/2014 | Spyrou | |
| 8,841,369 B2 | 9/2014 | Meyer | |
| 9,102,785 B2 | 8/2015 | Martz | |
| 9,657,206 B2 | 5/2017 | Greszta-Franz | |
| 2005/0090636 A1 | 4/2005 | Wenning | |
| 2008/0171816 A1 * | 7/2008 | Spyrou | C08G 18/227 524/95 |
| 2008/0262262 A1 * | 10/2008 | Richter | C07D 229/00 560/336 |
| 2009/0258962 A1 | 10/2009 | Martz | |
| 2015/0329751 A1 | 11/2015 | Stache | |
| 2016/0200857 A1 | 7/2016 | Williams | |
| 2017/0066179 A1 | 3/2017 | Diehl | |
| 2018/0037691 A1 | 2/2018 | Fitzgerald | |

FOREIGN PATENT DOCUMENTS

| | | |
|---|---|---|
| EP | 0138465 | 4/1985 |
| EP | 0193068 | 9/1986 |
| GB | 1121196 | 7/1968 |
| WO | WO 1997-023536 | 7/1997 |
| WO | WO 2008-028769 | 3/2008 |
| WO | WO 2018-109617 | 6/2018 |
| WO | WO 2019-048956 | 3/2019 |
| WO | WO 2019-175709 | 9/2019 |
| WO | WO 2019-175714 | 9/2019 |
| WO | WO 2020-060893 | 3/2020 |
| WO | WO 2020-065438 | 4/2020 |
| WO | WO 2020-121116 | 6/2020 |
| WO | WO 2020-121124 | 6/2020 |

OTHER PUBLICATIONS

International Search Report for PCT International Application No. PCT/IB2019/057938, mailed on Nov. 26, 2019, 3 pages.

* cited by examiner

POLYMERIC MATERIAL INCLUDING A URETDIONE-CONTAINING MATERIAL AND A THERMALLY ACTIVATABLE AMINE, TWO-PART COMPOSITIONS, AND METHODS

CROSS REFERENCE TO RELATED APPLICATIONS

This application is a national stage filing under 35 U.S.C. 371 of PCT/IB2019/057938, filed Sep. 19, 2019, which claims the benefit of U.S. Application No. 62/736,273, filed Sep. 25, 2018; and U.S. Application No. 62/820,423, filed Mar. 19, 2019, the disclosures of which are incorporated by reference in their entireties herein.

TECHNICAL FIELD

The present disclosure relates to polymeric materials that include uretdione-containing materials, such as two-part compositions.

BACKGROUND

Two-part urethane adhesives and sealants are commercially available from a variety of companies. These systems typically involve one component that is an oligomer/polymer terminated with isocyanate groups and a second component that is a polyol. When mixed, the isocyanate reacts with polyol to form carbamate groups. While this is established and effective chemistry, it suffers from a sensitivity to moisture due to ability of the isocyanate to be deactivated when reacted with water. Hence, there remains a need for adhesives and sealants that advantageously have less sensitivity to water.

SUMMARY

In a first aspect, a polymeric material is provided. The polymeric material includes a polymerized reaction product of a polymerizable composition and a thermally activatable amine curative. At least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (a) a uretdione-containing material comprising a reaction product of a diisocyanate reacted with itself; (b) a first hydroxyl-containing compound having more than one OH group; and (c) an optional second hydroxyl-containing compound having a single OH group. The optional second hydroxyl-containing compound is a primary alcohol or a secondary alcohol.

In a second aspect, a two-part composition is provided. The two-part composition includes (1) a first part comprising a polymeric material including (a) a polymerized reaction product of a polymerizable composition comprising components and (b) an optional thermally activatable amine curative; and (2) a second part including (a) at least one liquid amine; and (b) an optional thermally activatable amine curative. At least one molecule of the at least one liquid amine has an average amine functionality of 2.0 or greater, and each amine includes a primary amine or a secondary amine. The thermally activatable amine curative is present in at least one of the first part or the second part and at least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (i) a uretdione-containing material comprising a reaction product of a diisocyanate reacted with itself; (ii) a first hydroxyl-containing compound having more than one OH group; and (iii) an optional second hydroxyl-containing compound having a single OH group. The optional second hydroxyl-containing compound is a primary alcohol or a secondary alcohol.

In a third aspect, a polymerized product is provided. The polymerized product is the polymerized product of a two-part composition. The two-part composition includes (1) a first part comprising a polymeric material including (a) a polymerized reaction product of a polymerizable composition comprising components and (b) an optional thermally activatable amine curative; and (2) a second part including (a) at least one liquid amine; and (b) an optional thermally activatable amine curative. At least one molecule of the at least one liquid amine has an average amine functionality of 2.0 or greater, and each amine includes a primary amine or a secondary amine. The thermally activatable amine curative is present in at least one of the first part or the second part and at least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (i) a uretdione-containing material comprising a reaction product of a diisocyanate reacted with itself; (ii) a first hydroxyl-containing compound having more than one OH group; and (iii) an optional second hydroxyl-containing compound having a single OH group. The optional second hydroxyl-containing compound is a primary alcohol or a secondary alcohol.

In a fourth aspect, a method of adhering two substrates together is provided. The method includes (a) obtaining a two-part composition; (b) combining at least a portion of the first part with at least a portion of the second part to form a mixture; (c) disposing at least a portion of the mixture on a first major surface of a first substrate; and (d) contacting a first major surface of a second substrate with the mixture disposed on the first substrate. The two-part composition includes (1) a first part comprising a polymeric material including (a) a polymerized reaction product of a polymerizable composition comprising components and (b) an optional thermally activatable amine curative; and (2) a second part including (a) at least one liquid amine; and (b) an optional thermally activatable amine curative. At least one molecule of the at least one liquid amine has an average amine functionality of 2.0 or greater, and each amine includes a primary amine or a secondary amine. The thermally activatable amine curative is present in at least one of the first part or the second part and at least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (i) a uretdione-containing material comprising a reaction product of a diisocyanate reacted with itself; (ii) a first hydroxyl-containing compound having more than one OH group; and (iii) an optional second hydroxyl-containing compound having a single OH group. The optional second hydroxyl-containing compound is a primary alcohol or a secondary alcohol.

In a fifth aspect, a method of curing a two-part composition is provided. The method includes (a) obtaining a two-part composition; (b) combining at least a portion of the first part with at least a portion of the second part to form a mixture; and (c) subjecting the mixture to a temperature of 45° C. or higher to provide a polymerized reaction product of the mixture. The two-part composition includes (1) a first part comprising a polymeric material including (a) a polymerized reaction product of a polymerizable composition comprising components and (b) an optional thermally activatable amine curative; and (2) a second part including (a) at least one liquid amine; and (b) an optional thermally activatable amine curative. At least one molecule of the at least one liquid amine has an average amine functionality of 2.0 or greater, and each amine includes a primary amine or a secondary amine. The thermally activatable amine curative is present in at least one of the first part or the second part and at least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (i) a uretdione-containing material comprising a reaction product of a diisocyanate reacted with itself; (ii) a first hydroxyl-containing compound having more than one OH group; and (iii) an optional second hydroxyl-containing compound having a single OH group. The optional second hydroxyl-containing compound is a primary alcohol or a secondary alcohol.

The inclusion of two different amines allows for a two-stage cure of the polymeric material. One amine reacts rapidly and promotes rapid generation of green strength and viscosity increase, followed by a period of low to moderate strength that enables re-workability and/or delayed bonding. After addition of heat, the thermally activatable amine curative reacts and cure of the polymeric material progresses more rapidly.

The above summary is not intended to describe each embodiment or every implementation of aspects of the invention. The details of various embodiments are set forth in the description below. Other features, objects, and advantages will be apparent from the description and from the claims.

Figure 1:
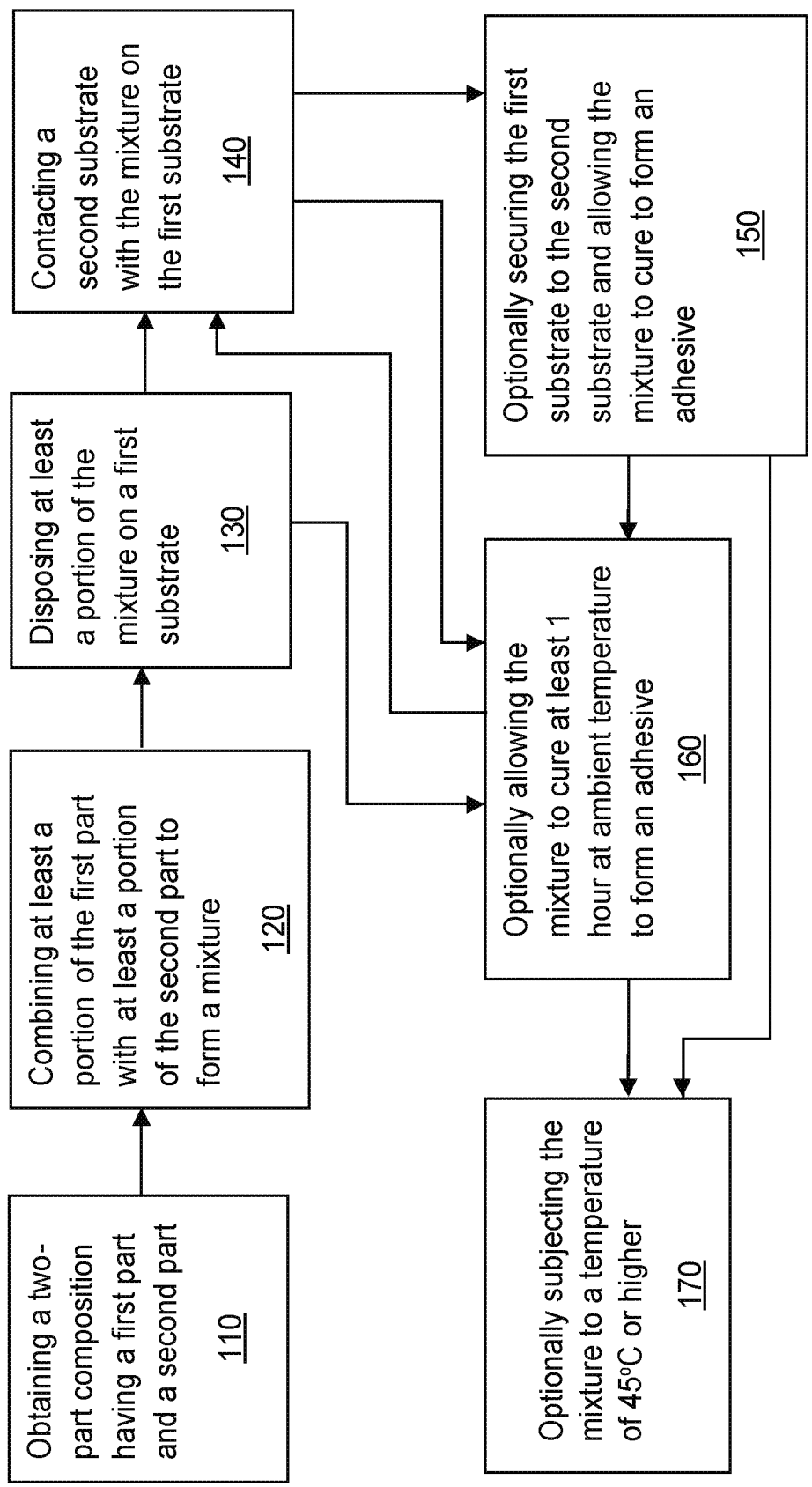
FIG. 1 is a flow chart of an exemplary method of adhering two substrates together, according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

The present disclosure provides polymeric materials, polymerizable compositions, and two-part compositions useful for instance in coatings and/or adhesives that have good flowability and reactivity (e.g., without added solvent), acceptable cure and/or adhesion in a desired amount of time, as compared to similar compositions instead containing isocyanates. Further, coatings and adhesives according to at least certain embodiments of the present disclosure are essentially free of isocyanates. This is advantageous because isocyanates tend to be sensitizers upon first contact (e.g., to skin) such that subsequent contact causes inflammation. Coatings/adhesives containing isocyanates exhibit more sensitivity to water than other compounds, as noted above, so minimizing an isocyanate content in a coating or adhesive may improve reliability during curing as well as simplify storage and handling of the polymeric materials, polymerizable compositions, and two-part compositions.

The terms "a", "an", "the", "at least one", and "one or more" are used interchangeably.

The term "and/or" means one or both such as in the expression A and/or B refers to A alone, B alone, or to both A and B.

The term "essentially" means 95% or more.

The term "equivalents" refers to the number of moles of a functional group (e.g., OH groups, isocyanate groups, uretdione groups, etc.) per molecule of a polymer chain or per mole of a different functional group.

the term "amidine group" does not refer an amidine group in an imidazole ring, although the amidine group may be contained in one or more other rings (e.g., 1,5-diazabicyclo [4.3.0]non-5-ene or 1,8-diazabicyclo[5.4.0]undec-7-ene);

The term "alkyl" refers to a monovalent radical of an alkane. Suitable alkyl groups can have up to 50 carbon atoms, up to 40 carbon atoms, up to 30 carbon atoms, up to 20 carbon atoms, up to 16 carbon atoms, up to 12 carbon atoms, up to 10 carbon atoms, up to 8 carbon atoms, up to 6 carbon atoms, up to 4 carbon atoms, or up to 3 carbon atoms. The alkyl groups can be linear, branched, cyclic, or a combination thereof. Linear alkyl groups often have 1 to 30 carbon atoms, 1 to 20 carbon atoms, 1 to 10 carbon atoms, 1 to 6 carbon atoms, or 1 to 4 carbon atoms. Branched alkyl groups often have 3 to 50 carbon atoms, 3 to 40 carbon atoms, 4 to 20 carbon atoms, 3 to 10 carbon atoms, or 3 to 6 carbon atoms. Cyclic alkyl groups often have 3 to 50 carbon atoms, 5 to 40 carbon atoms, 6 to 20 carbon atoms, 5 to 10 carbon atoms, or 6 to 10 carbon atoms.

The term "alkylene" refers to a divalent group that is a radical of an alkane. The alkylene can be straight-chained, branched, cyclic, or combinations thereof. The alkylene typically has 1 to 20 carbon atoms. In some embodiments, the alkylene contains 4 to 14 carbon atoms, 1 to 10 carbon atoms, 1 to 8 carbon atoms, 1 to 6 carbon atoms, or 1 to 4 carbon atoms. The radical centers of the alkylene can be on the same carbon atom (i.e., an alkylidene) or on different carbon atoms. In certain embodiments, the alkylene can be substituted with an OH group.

The term "alkane-triyl" refers to a trivalent radical of an alkane.

The term "aryl" refers to a monovalent group that is radical of an arene, which is a carbocyclic, aromatic compound. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, naphthyl, acenaphthyl, anthraquinonyl, phenanthryl, anthracenyl, pyrenyl, perylenyl, and fluorenyl.

The term "aralkyl" refers to a monovalent group of formula —R—Ar where R is an alkylene and Ar is an aryl group. That is, the aralkyl is an alkyl substituted with an aryl.

The term "aralkylene" refers to a divalent group of formula —R—Ar$^a$ where R is an alkylene and Ar$^a$ is an arylene (i.e., an alkylene is bonded to an arylene).

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The term "alkarylene" refers to a divalent group that is an arylene group substituted with an alkyl group or an arylene group attached to an alkylene group. Unless otherwise indicated, the alkarylene group typically has from 1 to 20 carbon atoms, 4 to 14 carbon atoms, 1 to 10 carbon atoms, 1 to 6 carbon atoms, or 1 to 4 carbon atoms. Unless otherwise indicated, for both groups, the alkyl or alkylene portion typically has from 1 to 20 carbon atoms, 1 to 10 carbon atoms. 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms. In certain embodiments, the arylene group or the alkarylene group has 4 to 14 carbon atoms.

The term "aprotic" refers to a component that does not have a hydrogen atom bound to an oxygen (as in a hydroxyl group) or a nitrogen (as in an amine group). In general terms, any component that does not contain labile H+ is called an aprotic component. The molecules of such components cannot donate protons (H+) to other components.

The term "basic salt" refers to a salt that forms a basic solution if dissolved in water having a pH of 7. The salt may be associated with other substances such as, e.g., water (i.e., a hydrate).

The term "carbamate" refers to a compound having the general formula R—N(H)—C(O)—O—R'. Preferred R groups include alkylene groups.

The term "diisocyanate" refers to a compound having the general formula O=C=N—R—N=C=O. Preferred R groups include alkylene and arylene groups.

The term "diol" refers to a compound with two OH groups.

The term "nonacidic" means free of acidic groups that are at least as acidic as the corresponding carboxyl group.

The term "triamine" refers to a compound with three amino groups.

The term "polyester" refers to repeating difunctional polymer wherein the repeat units are joined by ester linkages. Ester groups have the general formula —R—C(O)—OR'. The term "polyether" refers to repeating difunctional alkoxy radicals having the general formula —O—R—. Preferred R and R' groups have the general formula —C$_n$H$_{2n}$— and include, for example, methylene, ethylene and propylene (including n-propylene and i-propylene) or a combination thereof. Combinations of R and R' groups may be provided, for example, as random or block type copolymers.

The term "polyol" refers to a compound with two or more hydroxyl (i.e., OH) groups.

The term "polymeric material" refers to any homopolymer, copolymer, terpolymer, and the like, as well as any diluent.

The term "non-reactive diluent" refers to a component that can be added to adjust the viscosity of the polymerizable composition. By "non-reactive" it is meant that the diluent does not participate in a polymerization reaction (e.g., with a curative, a uretdione-containing material, or a hydroxyl-containing compound having one or more OH groups), of the polymerizable composition. The diluent does not react with such components during manufacture of a two-part composition, during manufacture of a coating or adhesive, during application of the coating or adhesive to a substrate, or upon aging. Typically, the diluent is substantially free of reactive groups. In some embodiments, the molecular weight of the unreactive diluent is less than the molecular weight of components such as the uretdione-containing material. The non-reactive diluent is not volatile, and substantially remains in the coating or adhesive after curing. The boiling point of the non-reactive diluent may be greater than 200° C.

The term "reactive diluent" refers to a component that can be added to adjust the viscosity of the polymerizable composition and does participate in a polymerization reaction (e.g., with a curative, a uretdione-containing material, or a hydroxyl-containing compound having one or more OH groups), of the polymerizable composition. The diluent reacts with such components during at least one of: during application of the coating or adhesive to a substrate or upon aging. The diluent includes one or more reactive groups, such as epoxy groups. In some embodiments, the molecular weight of the reactive diluent is less than the molecular weight of components such as the uretdione-containing material.

The term "primary alcohol" refers to an alcohol in which the OH group is connected to a primary carbon atom (e.g., having the general formula —CH$_2$OH). The term "secondary alcohol" refers to an alcohol in which the OH group is connected to a secondary carbon atom (e.g., having the general formula —CHROH, where R is a group containing a carbon atom).

The term "thermally activatable amine" refers to an amine compound that is (e.g., substantially) inactive at ambient temperature but capable of reaction at a temperature of 50° C. or higher.

The term "ambient temperature" refers to a temperature in the range of 20° C. to 25° C., inclusive.

The term "liquid" refers to the state of matter that is not solid or gas, which has a definite volume and an indefinite shape. Liquids encompass emulsions, suspensions, solutions, and pure components (e.g., polymeric resins) and exclude (e.g., solid) powders and particulates.

In a first aspect, a polymeric material is provided. The polymeric material includes a polymerized reaction product of a polymerizable composition, and a thermally activatable amine curative. At least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (a) a uretdione-containing material comprising a reaction product of a diisocyanate reacted with itself; (b) a first hydroxyl-containing compound having more than one OH group; and (c) an optional second hydroxyl-containing compound having a single OH group. The optional second hydroxyl-containing compound is a primary alcohol or a secondary alcohol. Stated another way, the first aspect provides:

A polymeric material comprising a polymerized reaction product of a polymerizable composition comprising components, the components comprising:

(a) a uretdione-containing material comprising a reaction product of a diisocyanate reacted with itself;

(b) a first hydroxyl-containing compound having more than one OH group; and (c) an optional second hydroxyl-containing compound having a single OH group, wherein the second hydroxyl-containing compound is a primary alcohol or a secondary alcohol; and a thermally activatable amine curative, at least one molecule of the thermally activatable amine having an average amine functionality of 2.0 or greater;

wherein the polymeric material has an average uretdione ring functionality of at least 1.2 and wherein the polymeric material comprises a solids content of 90% or greater.

A uretdione can be formed by the reaction of a diisocyanate with itself and has the following general formula:

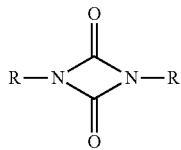

In some embodiments, the diisocyanate comprises a functional group selected from Formula X, Formula XI, and Formula XII:

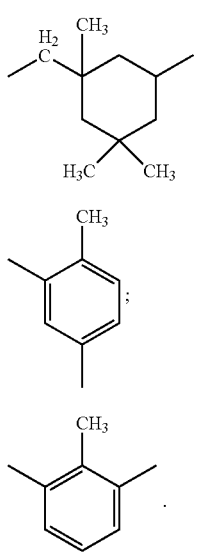

There are a variety of reaction products that can occur as a diisocyanate reacts with itself, and typically the reaction of a diisocyanate with itself results in a blend of two or more reaction products. Preferably, the reaction of a diisocyanate with itself proceeds to a degree such that the polymeric material contains 25% by weight or less or 23% by weight or less of isocyanate groups, as determined by infrared Fourier Transform spectroscopy (e.g., a Nicolet 6700 FT-IP Spectrometer, Thermo Scientific (Madison, WI)) where the weight percent of isocyanate in a material is calculated as the moles of isocyanate functional groups multiplied by 42 grams per mole (g/mol) and divided by the mass of the material.

In certain embodiments, the uretdione-containing material comprises a compound of Formula I:

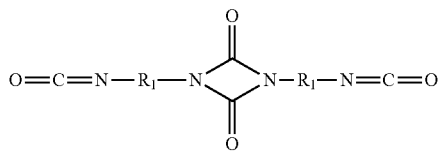

wherein $R_1$ is independently selected from a $C_4$ to $C_{14}$ alkylene, arylene, and alkarylene. In some embodiments, the diisocyanate comprises hexamethylene diisocyanate. One preferable uretdione-containing material is a hexamethylene diisocyanate-based blend of materials comprising uretdione functional groups, commercially available under the trade name DESMODUR N3400 from Covestro (Leverkusen, Germany). Additional uretdione-containing materials are commercially available under the trade name CRELAN EF 403 also from Covestro, and under the trade name META-LINK U/ISOQURE TT from Isochem Incorporated (New Albany, OH).

Typically, the polymeric material comprises greater than one uretdione functional group in a backbone of the polymeric material, such as an average of 1.1 or greater of a uretdione functional group in a backbone of the polymeric material, 1.2 or greater, 1.3 or greater, 1.4 or greater, 1.5 or greater, 1.6 or greater, 1.8 or greater, 2.0 or greater, 2.2 or greater, 2.4 or greater, 2.6 or greater, 2.8 or greater, 3.0 or greater, 3.2 or greater, 3.4 or greater, or 3.6 or greater; and an average of 6.0 or less of a uretdione functional group in a backbone of the polymeric material, 5.8 or less, 5.6 or less, 5.4 or less, 5.2 or less, 5.0 or less, 4.8 or less, 4.6 or less, 4.4 or less, 4.2 or less, 4.0 or less, 3.8 or less, 3.5 or less, 3.3 or less, 3.1 or less, 2.9 or less, 2.7 or less, 2.5 or less, 2.3 or less, 2.1 or less, or even an average of 1.9 or less of a uretdione functional group in a backbone of the polymeric material. Stated another way, the polymeric material may comprise an average of 1.3 to 6.0, inclusive, or 1.5 to 4.0, inclusive, of a uretdione functional group in a backbone of the polymeric material. In select embodiments, the polymeric material comprises an average of 1.3 to 5.0, inclusive, of a uretdione functional group in a backbone of the polymeric material and the polymerizable composition is free of the second hydroxyl-containing compound. The amount of the uretdione functional group can be determined as described in the Examples below. In some embodiments, the uretdione-containing material is present in an amount of 10% by weight or greater, based on the total weight of the polymeric material, 15% by weight or greater, 20% by weight or greater, 25% by weight or greater, 30% by weight or greater, 35% by weight or greater, 40% by weight or greater, 45% by weight or greater, or 50% by weight or greater, based on the total weight of the polymeric material. In some embodiments, the uretdione-containing material is present in an amount of 90% by weight or less, based on the total weight of the polymeric material.

One exemplary simplified general reaction scheme of a uretdione-containing material with a first-hydroxyl-containing compound and an (optional) second hydroxyl-containing compound is provided below in Scheme 1:

Scheme 1

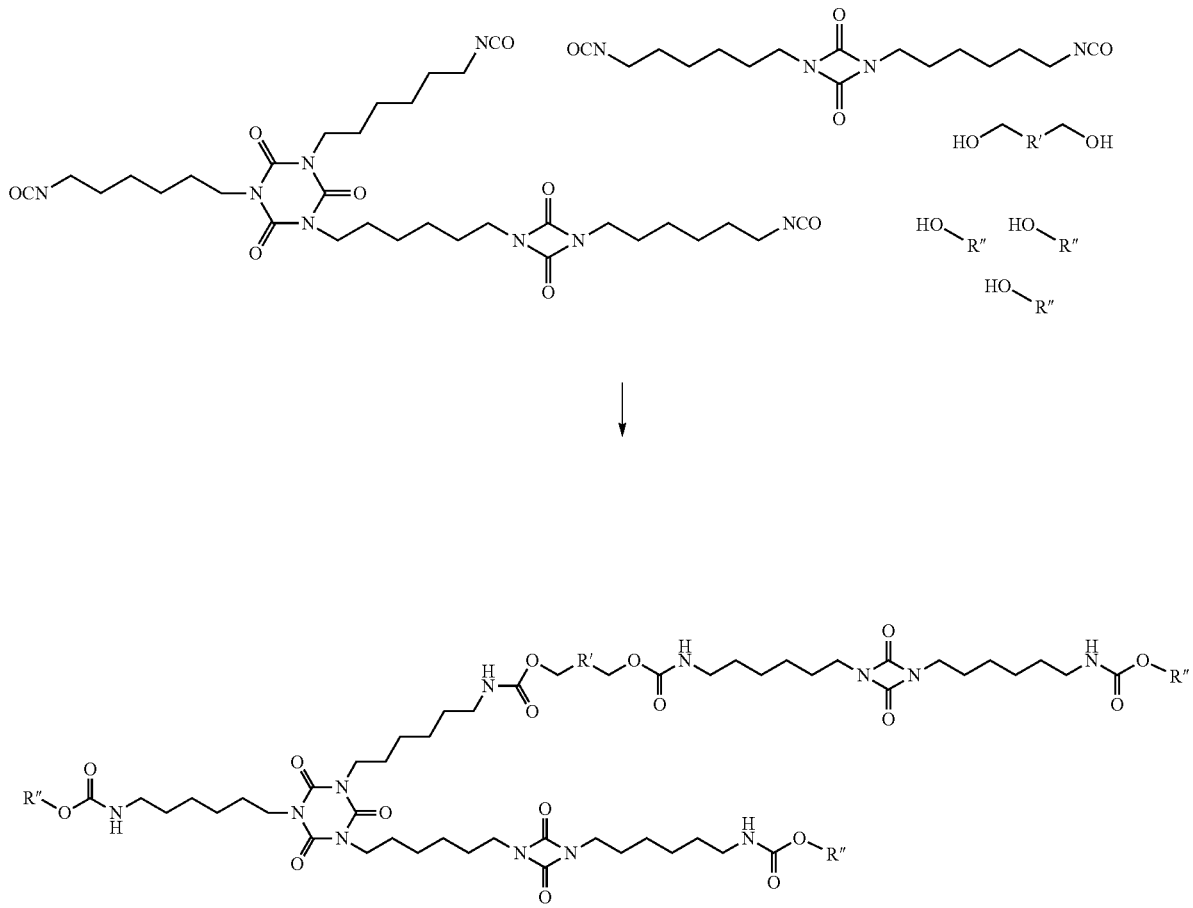

In the particular reaction scheme of Scheme 1, the uretdione-containing material comprises two compounds containing uretdione groups, one of which also contains an isocyanurate compound. In certain embodiments of the polymeric material, the polymeric material comprises an average of 1.3 or fewer isocyanurate units per molecule of the polymeric material. This can be because isocyanurate units may not contribute desirable properties to the polymeric material.

Similarly, an exemplary simplified general reaction scheme of a uretdione-containing material with a first-hydroxyl-containing compound, but without the optional second hydroxyl-containing compound is provided below in Scheme 2:

Scheme 2

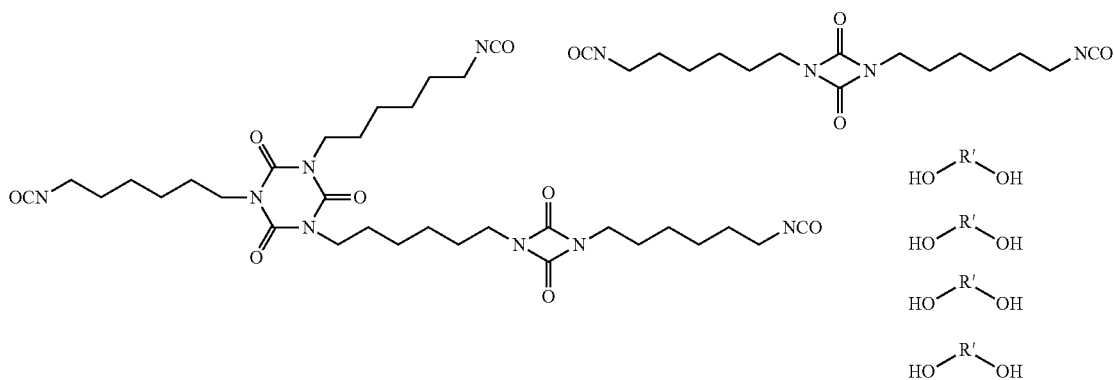

-continued

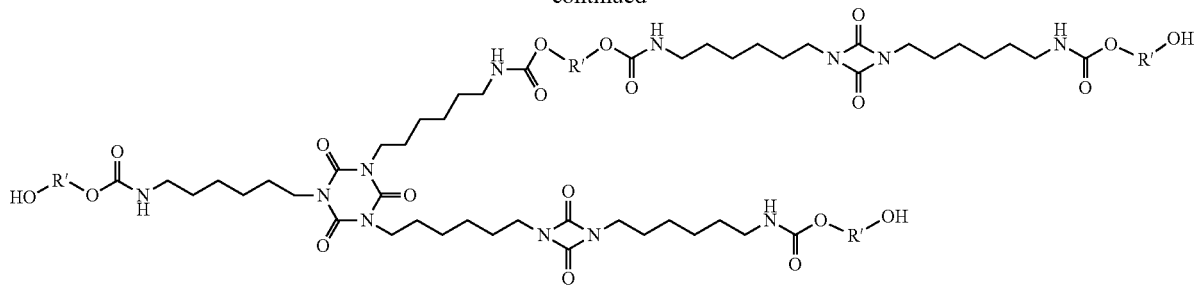

The polymeric material also typically comprises one or more carbamate functional groups per molecule of the polymeric material in a backbone of the polymeric material. The carbamate functional groups are formed by the reaction of the first hydroxyl-containing compound (and optionally the second hydroxyl-containing compound) with the isocyanate groups present on uretdione-containing compounds. For example, the polymeric material may comprise an average of 0.2 or greater of carbamate functional groups in the backbone of the polymeric material, 0.5 or greater, 1 or greater, 2 or greater, 3 or greater, 4 or greater, 5 or greater, 6 or greater, 7 or greater, or an average of 8 or greater of carbamate functional groups in the backbone of the polymeric material; and an average of 18 or less of carbamate functional groups in the backbone of the polymeric material, 17 or less, 16 or less, 15 or less, 14 or less, 13 or less, 12 or less, 11 or less, 10 or less, or an average of 9 or less of carbamate functional groups in the backbone of the polymeric material. Stated another way, the polymeric material may comprise an average of 0.2 to 18, inclusive, or 2 to 10, inclusive, of carbamate functional groups in the backbone of the polymeric material. The average carbamate functional group content of the polymeric material can be determined as described in the Examples below.

In certain embodiments, the first hydroxyl-containing compound is an alkylene polyol, a polyester polyol, or a polyether polyol. Often the first hydroxyl-containing compound is a diol, such as a branched diol. For example, in some embodiments the first hydroxyl-containing compound is of Formula II:

HO—$R_2$—OH  II wherein $R_2$ is selected from $R_3$, an alkylene, and an alkylene substituted with an OH group, wherein $R_3$ is of Formula III or Formula IV:

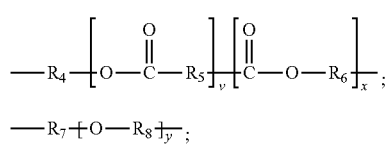

wherein each of $R_4$, $R_5$, $R_6$, $R_7$, and $R_8$ is independently an alkylene, wherein each of v and y is independently 1 to 40, and wherein x is selected from 0 to 40. Optionally, $R_2$ is selected from $C_1$ to $C_{20}$ alkylene and a $C_1$ to $C_{20}$ alkylene substituted with an OH group.

In certain embodiments of the first hydroxyl-containing compound, each of $R_4$, $R_5$, $R_6$, $R_7$, and $R_8$ is independently selected from a $C_1$ to $C_{20}$ alkylene. Alternatively, the first hydroxyl-containing compound can be of Formula V or Formula VI:

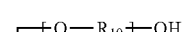
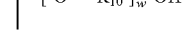
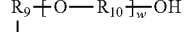

V

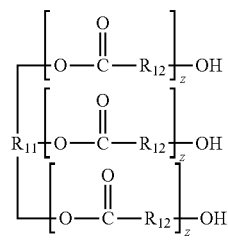

VI wherein each of $R_9$ and $R_u$ is independently an alkane-triyl, wherein each of $R_{10}$ and $R_{12}$ is independently selected from an alkylene, and wherein each of w and z is independently selected from 1 to 20. Preferably, each of $R_{10}$ and $R_{12}$ is independently selected from a $C_1$ to $C_{20}$ alkylene.

Suitable first hydroxyl-containing compounds include branched alcohols, secondary alcohols, or ethers, for instance and without limitation, 2,2-dimethyl-1,3-propanediol, 2-methyl-1,3-propanediol, diethylene glycol, poly(tetramethylene ether) glycol. 2-ethylhexane-1,3-diol, and 1,3-butanediol. Such suitable first hydroxyl-containing compounds are commercially available from chemical suppliers including for example, Alfa Aesar (Ward Hill, MA), JT Baker (Center Valley, PA), TCI (Portland, OR), and Fisher Scientific (Waltham, MA).

In certain embodiments, the optional second hydroxyl-containing compound is an alkyl alcohol, a polyester alcohol, or a polyether alcohol, such as a branched alcohol and/or a secondary alcohol. For example, in some embodiments the second hydroxyl-containing compound is present and is of Formula VII:

$R_{13}$—OH  VII;

wherein $R_{13}$ is selected from $R_{14}$, $R_{15}$, and a $C_1$ to $C_{50}$ alkyl;

wherein $R_{14}$ is of Formula VIII:

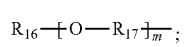

VIII wherein m=1 to 20, $R_{16}$ is an alkyl, and $R_{17}$ is an alkylene; wherein $R_{15}$ is of Formula IX:

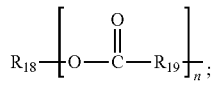

wherein n=1 to 20, $R_{18}$ is an alkyl, and $R_{1g}$ is an alkylene. Preferably, $R_{13}$ is a $C_4$-$C_{20}$ alkyl, as the alkyl groups below $C_4$ have a tendency to form a crystalline polymeric material.

Suitable optional second hydroxyl-containing compounds can include branched alcohols or secondary alcohols, for instance and without limitation, 2-butanol, 2-ethyl-1-hexanol, isobutanol, and 2-butyl-octanol, each of which is commercially available from Alfa Aesar (Ward Hill, MA).

In an embodiment, the first hydroxyl-containing compound is of Formula II and the optional second hydroxyl-containing compound is present and is of Formula VII, wherein $R_2$ of the compound of Formula II is of Formula III, and wherein $R_{13}$ of the compound of Formula VII is a branched $C_4$ to $C_{20}$ alkyl.

In select embodiments, the first hydroxyl-containing compound is a diol and the reaction product comprises 0.2 to 0.65, inclusive, or 0.25 to 0.61, inclusive, of diol equivalents relative to isocyanate equivalents. Optionally, a sum of the OH equivalents of the first hydroxyl-containing compound and the (optional) second hydroxyl-containing compound is equal to or greater than the isocyanate equivalents of the polymeric material.

Preferably, the polymeric material is essentially free of isocyanates. By "essentially free of isocyanates" it is meant that the polymeric material contains 5% by weight or less, 4% by weight or less, 3% by weight or less, 2% by weight or less, or 1% by weight or less of isocyanate groups, as determined by infrared Fourier Transform spectroscopy (e.g., a Nicolet 6700 FT-IP Spectrometer, Thermo Scientific (Madison, WI)), where the weight percent of isocyanate in a material is calculated as the moles of isocyanate functional groups multiplied by 42 g/mol and divided by the mass of the material.

Exemplary thermally activatable amine curatives should be substantially inactive at room temperature but be capable of activation at elevated temperature, preferably above about 50° C. to 120° C. or higher, depending on the system and application, to effect additional (e.g., second stage) curing of the two-part composition. Suitable thermally activatable amine curatives are described in British Patent 1, 121, 196 (Ciba Geigy AG), European Patent Application 138465A (Ajinomoto Co.) and European Patent Application 193068A (Asahi Chemical). Other suitable thermally activatable amine curatives include a reaction product of (i) a polyfunctional epoxy compound, (ii) an imidazole compound such as 2-ethyl-4-methylimidazole and (iii) phthalic anhydride. The polyfunctional epoxy compound may be any compound having two or more epoxy groups in the molecule as described in U.S. Pat. No. 4,546,155 (Hirose et al.). Other suitable thermally activatable amine curatives are those given in U.S. Pat. No. 5,077,376 (Dooley). Additional thermally activatable amine curatives include 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, and addition products of triazine with isocyanuric acid, succinohydrazide, adipohydrazide, isophthalohydrazide, o-oxybenzohydrazide, and salicylohydrazide.

Commercially available thermally activatable amine curatives (also sometimes termed latent hardeners) include, for example, those having the trade designations: AMICURE MY-24, AMICURE GG-216, and AMICURE ATU CARBAMATE from Ajinomoto Fine-Techno Co., Inc., Kanagawa, Japan; NOVACURE HX-372 (commercially available from Asahi Kasei Kogyo K. K., Osaka, Japan); AJICURE such as, for example, grades PN-23 (100-105° C.), PN—H (120-125° C.), PN-31 (115-120° C.), PN-40 (105-110° C.), and MY-H (125-130° C.) from Ajinomoto Fine-Techno Co., Inc.; encapsulated modified imidazoles such as those available as TECHNICURE LC-100 encapsulated modified imidazole (m.p.=90-100° C.) and Technicure LC-80 encapsulated modified imidazole (m.p. =90-100° C.) from ACCI Specialty Materials, Linden, New Jersey; and latent amine curing agents available as FUJICURE FXR-1020 (m.p. 115-130° C.), FUJICURE FXR-1030 (m.p. =135-145° C.), FUJICURE FXR-1081 (m.p. =115-125° C.), FUJICURE FXR-1090FA (m.p. =110-120° C.), FUJICURE FXR-1121 (128-138° C.), SANCURE LC-125 (110-125° C.) from Sanho Chemical Co., Ltd., Kaohsiung City, Taiwan.

The thermally activatable amine curative is typically included in an amount sufficient to effect additional curing of the two-part thermally curable composition when heated sufficiently. For example, thermally activatable amine curative may suitably be present in amounts of from about 5 to about 45 parts, desirably from about 1 to about 30 parts, more desirably from about 10 to about 20 parts by weight per 100 parts of the polymeric material. Preferably, a thermally activatable amine curative is present in an amount of 0.5 to 30 percent by weight, more preferably 1 to 15 percent by weight, based on the total weight of the polymeric material.

In some embodiments, the thermally activatable amine curative is not present at the time of the polymerization of the polymerizable composition containing the components of (a) a uretdione-containing material comprising a reaction product of a diisocyanate reacted with itself, (b) a first hydroxyl-containing compound having more than one OH group, and, if present, (c) a second hydroxyl-containing compound having a single OH group. In such embodiments, components (a), (b), and, if present, (c), are reacted, and then the thermally activatable amine curative is combined with the reaction product of components (a), (b), and, if present, (c).

In alternate embodiments, the thermally activatable amine curative is present at the time of reaction of components (a), (b), and, if present, (c). In such embodiments, it is preferred that most or all the thermally activatable amine curative does not participate in the polymerization of the polymerizable components including components (a), (b), and, if present, (c), but rather remains available for later reaction.

An optional acidic stabilizer may be added to the polymeric material to inhibit the thermally activatable amine curative by an acid-base interaction, thereby prolonging the working time and/or storage stability of the polymeric material. Exemplary acidic stabilizers include carboxylic acids (including fluorinated carboxylic acids), phosphonic acids (including fluorinated carboxylic acids), sulfonic acids (including fluorinated carboxylic acids), perfluorosulfonimides, and Lewis acids (e.g., $BF_3$). In some embodiments, the optional acidic stabilizer is selected from the group consisting of $BF_3$, $C_1$-$C_{16}$ monocarboxylic acids, $C_1$-$C_{16}$ dicarboxylic acids, $C_6$-$C_{14}$ arylcarboxylic acids, $C_1$-$C_{16}$ monosulfonic acids, $C_1$-$C_{16}$ disulfonic acids, $C_6$-$C_{14}$ arylsulfonic acids, $C_1$-$C_{16}$ monophosphonic acids, $C_1$-$C_{16}$ diphosphonic acids, $C_6$-$C_{14}$ arylphosphonic acids, and combination thereof.

The optional acidic stabilizer may be added in any amount, preferably in an amount of 0.005 to 5.0 percent by weight, more preferably 0.01 to 1 percent by weight, based on the total weight of the polymeric material.

In preferred embodiments, the polymeric material contains less than 10 weight percent of total solvent content, preferably less than 5 weight percent of total solvent content, more preferably less than 1 weight percent of total solvent content. In some embodiments, the polymeric material is solvent-free. Typically, the polymeric material is in the form of a liquid, as opposed to a solid (e.g., dry powder, pellets, etc.) despite having a high solids content.

In some embodiments, the polymeric material further includes at least one epoxy component. It has been discovered that the introduction of a reactive epoxy diluent results in an improvement in the viscosity of a polymeric material including a uretdione-containing material, such that use of crystalline or high viscosity uretdione-containing materials has been enabled.

The epoxy component may optionally include an epoxy resin comprising one or more epoxy compounds that can be monomeric or polymeric, and aliphatic, cycloaliphatic, heterocyclic, aromatic, hydrogenated, and/or a mixture thereof. Preferred epoxy compounds contain more than 1.5 epoxy groups per molecule and more preferably at least 2 epoxide groups per molecule.

The epoxy component can include linear polymeric epoxides having terminal epoxy groups (e.g., a diglycidyl ether of a polyoxyalkylene glycol), polymeric epoxides having skeletal epoxy groups (e.g., polybutadiene poly epoxy), polymeric epoxides having pendant epoxy groups (e.g., a glycidyl methacrylate polymer or copolymer), or a mixture thereof.

Exemplary epoxy compounds include, for example, aliphatic (including cycloaliphatic) and aromatic epoxy compounds. The epoxy compound(s) may be monomeric, oligomeric, or polymeric epoxides, or a combination thereof. The epoxy component may be a pure compound or a mixture comprising at least two epoxy compounds. The epoxy component typically has, on average, at least 1 epoxy (i.e., oxiranyl) group per molecule, preferably at least about 1.5 and more preferably at least about 2 epoxy groups per molecule. Hence, the epoxy component may comprise at least one monofunctional epoxy, and/or may comprise at least one multifunctional epoxy. In some cases, 3 (e.g., trifunctional epoxy), 4, 5, or even 6 epoxy groups may be present, on average. Polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). Other useful epoxy components are polyhydric phenolic formaldehyde condensation products as well as polyglycidyl ethers that contain as reactive groups only epoxy groups or hydroxy groups. In certain embodiments, the epoxy component comprises at least one glycidyl ether group. The "average" number of epoxy groups per molecule can be determined by dividing the total number of epoxy groups in the epoxy-containing material by the total number of epoxy-containing molecules present.

The choice of epoxy component may depend upon the intended end use. For example, epoxides with flexible backbones may be desired where a greater amount of ductility is needed in the bond line. Materials such as diglycidyl ethers of bisphenol A and diglycidyl ethers of bisphenol F can help impart desirable structural adhesive properties upon curing, while hydrogenated versions of these epoxies may be useful for compatibility with substrates having oily surfaces.

Commercially available epoxy compounds include octadecylene oxide, epichlorohydrin, styrene oxide, vinylcyclohexene oxide, glycidol, glycidyl methacrylate, vinylcyclohexene dioxide, 3,4-epoxycyclohexylmethyl-3,4-epoxycyclohexenecarboxylate, 3,4-epoxy-6-methylcyclohexylmethyl-3,4-epoxy-6-methylcyclohexene carboxylate, bis(3,4-epoxy-6-methylcyclohexylmethyl) adipate, bis(2,3-epoxycyclopentyl) ether, dipentene dioxide, silicone resin containing epoxy functionality, flame retardant epoxy resins (e.g., DER-580, a brominated bisphenol type epoxy resin available from Dow Chemical Co.), 1,4-butanediol diglycidyl ether of phenol-formaldehyde novolac (e.g., DEN-431 and DEN-438 from Dow Chemical Co.), and resorcinol diglycidyl ether (e.g., Kopoxite from Koppers Company, Inc.), bis(3,4-epoxycyclohexyl)adipate, 2-(3,4-epoxycyclohexyl-5,5-spiro-3,4-epoxy) cyclohexene metadioxane, vinylcyclohexene monoxide 1,2-epoxyhexadecane, alkyl glycidyl ethers such as (e.g., HELOXY Modifier 7 from Momentive Specialty Chemicals, Inc., Waterford, NY), alkyl $C_{12}$-$C_{14}$ glycidyl ether (e.g., HELOXY Modifier 8 from Momentive Specialty Chemicals, Inc.), butyl glycidyl ether (e.g., HELOXY Modifier 61 from Momentive Specialty Chemicals, Inc.), cresyl glycidyl ether (e.g., HELOXY Modifier 62 from Momentive Specialty Chemicals, Inc.), p-tert-butylphenyl glycidyl ether (e.g., HELOXY Modifier 65 from Momentive Specialty Chemicals, Inc.), polyfunctional glycidyl ethers such as diglycidyl ether of 1,4-butanediol (e.g., HELOXY Modifier 67 from Momentive Specialty Chemicals, Inc.), diglycidyl ether of neopentyl glycol (e.g., HELOXY Modifier 68 from Momentive Specialty Chemicals, Inc.), diglycidyl ether of cyclohexanedimethanol (e.g., HELOXY Modifier 107 from Shell Chemical Co.), trimethylolethane triglycidyl ether (e.g., HELOXY Modifier 44 from Momentive Specialty Chemicals, Inc.), trimethylolpropane triglycidyl ether (e.g., HELOXY Modifier 48 from Momentive Specialty Chemicals, Inc.), polyglycidyl ether of an aliphatic polyol (e.g., HELOXY Modifier 84 from Momentive Specialty Chemicals, Inc.), polyglycol diepoxide (e.g., HELOXY Modifier 32 from Momentive Specialty Chemicals, Inc.), bisphenol F epoxides, 9,9-bis[4-(2,3-epoxypropoxy)phenyl]fluorenone (e.g., EPON 1079 from Momentive Specialty Chemicals, Inc.).

In certain embodiments, the epoxy component comprises an epoxidised (poly)olefmic resin, an epoxidised phenolic novolac resin, an epoxidised cresol novolac resin, a cycloaliphatic epoxy resin, or a combination thereof. Commercially available epoxy resins include for instance, epoxidised linseed oil (e.g., VIKOFLEX 7190 from Arkema Inc., King of Prussia, Pennsylvania), epoxy phenol novolac resin (e.g., EPALLOY 8250 from CVC Specialty Chemicals, Moorestown, New Jersey), multifunctional ephichlorohydrin/cresol novolac epoxy resin (e.g., EPON 164 from Hexion Specialty Chemicals GmbH, Rosbach, Germany), and cycloaliphatic epoxy resin (e.g., CELLOXIDE 2021 from Daicel Chemical Industries, Ltd., Tokyo, Japan).

In some embodiments, the epoxy component contains one or more epoxy compounds having an epoxy equivalent weight of from 100 g/mole to 1500 g/mol. More preferably, the epoxy resin contains one or more epoxy compounds having an epoxy equivalent weight of from 120 g/mole to 1200 g/mole. Even more preferably, the curable composition contains two or more epoxy compounds, wherein at least one epoxy resin has an epoxy equivalent weight of from 100 g/mole to 500 g/mole.

Useful epoxy compounds also include glycidyl ethers, e.g., such as those prepared by reacting a polyhydric alcohol with epichlorohydrin. Such polyhydric alcohols may include butanediol, polyethylene glycol, and glycerin.

Useful epoxy compounds also include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthyhnethane, and the 2,2'-, 2,3'-, 2,4'-, 3,3'-, 3,4'-, and 4,4'-isomers of dihydroxydiphenylmethane, dihydroxydiphenyldimethylmethane, dihydroxydiphenylethylmethylmethane, dihydroxydiphenylmethylpropylmethane, dihydroxy-diphenylethylphenylmethane, dihydroxydiphenylpropylphenylmethane, dihydroxydiphenylbutylphenylmethane, dihydroxydiphenyltolylethane, dihydroxydiphenyltolylmethvlmethane, dihydroxydiphenyldicyclohexylmethane, and dihydroxydiphenylcyclohexane.

Similarly, useful epoxy compounds also include a polyglycidyl ether of a polyhydric phenol. Example polyglycidyl ethers of a polyhydric phenol include a polyglycidyl ether of bisphenol A, bisphenol F, bisphenol AD, catechol, or resorcinol.

Useful epoxy compounds also include glycidyl ether esters and polyglycidyl esters. A glycidyl ether ester may be obtained by reacting a hydroxycarboxylic acid with epichlorohydrin. A polyglycidyl ether may be obtained by reacting a polycarboxylic acid with epichlorohydrin. Such polycarboxylic acids may include a dimer acid (e.g., RADIACID 0950 from Oleon, Simpsonville, SC), and a trimer acid (e.g., RADIACID 0983 from Oleon). Suitable glycidyl esters include a glycidyl ester of neodecanoic acid (e.g., ERISYS GS-110 from CVC Specialty Chemicals) and a glycidyl ester of a dimer acid (e.g., DRISYS GS-120 from CVC Specialty Chemicals).

Exemplary epoxy compounds also include glycidyl ethers of bisphenol A, bisphenol F, and novolac resins as well as glycidyl ethers of aliphatic or cycloaliphatic diols. Examples of commercially available glycidyl ethers include diglycidyl ethers of bisphenol A such as those available as EPON 828, EPON 1001, EPON 1310, and EPON 1510 from Hexion Specialty Chemicals GmbH, Rosbach, Germany; those available under the trade name D.E.R. (e.g., D.E.R. 331, 332, and 334) from Dow Chemical Co., Midland, Michigan; those available under the trade name EPICLON from Dainippon Ink and Chemicals, Inc. (e.g., EPICLON 840 and 850) and those available under the trade name YL-980 from Japan Epoxy Resins Co., Ltd.); diglycidyl ethers of bisphenol F (e.g., those available under the trade name EPICLON from Dainippon Ink and Chemicals, Inc. (e.g., EPICLON 830)); glycidyl ethers of novolac resins (e.g., novolac epoxy resins, such as those available under the trade name D.E.N, from Dow Chemical Co. (e.g., D.E.N. 425, 431, and 438)); and flame retardant epoxy resins (e.g., D.E.R. 580, a brominated bisphenol type epoxy resin available from Dow Chemical Co.). In some embodiments, aromatic glycidyl ethers, such as those prepared by reacting a dihydric phenol with an excess of epichlorohydrin, may be preferred. In some embodiments, nitrile rubber modified epoxies may be used (e.g., KELPOXY 1341 available from CVC Chemical).

Certain epoxy components can advantageously be used in high amounts, e.g., 45% or more by weight, based on the total weight of a polymeric material, and maintain an acceptable structural integrity of a coating or adhesive. Such epoxy components preferable for use in amounts of 45 wt. % or greater, 50 wt. %, 55 wt. %, or 60 wt. % or greater, include for instance, a polyglycidyl ether of a polyhydric phenol (preferably a polyglycidyl ether of bisphenol A, bisphenol F, bisphenol AD, catechol, or resorcinol), or at least one of an epoxidised (poly)olefinic resin, epoxidised phenolic novolac resin, epoxidised cresol novolac resin, or a cycloaliphatic epoxy resin.

Low viscosity epoxy compound(s) may be included in the epoxy component, for example, to reduce viscosity as noted above. For instance, in some embodiments, the epoxy component exhibits a dynamic viscosity of 100,000 centipoises (cP) or less, 75,000 cP or less, 50,000 cP or less, 30,000 cP or less, 20,000 cP or less, 15,000 cP or less, 10,000 cP or less, 9,000 cP or less, 8,000 cP or less, 7,000 cP or less, 6,000 cP or less, 5,000 cP or less, 4,000 cP or less, or 3,000 cP or less, as determined using a Brookfield viscometer. Conditions for the dynamic viscosity test include use of a LV4 spindle at a speed of 0.3 or 0.6 revolutions per minute (RPM) at 24 degrees Celsius. In some embodiments, one or more epoxy components each has a molecular weight of 2,000 grams per mole or less. Examples of low viscosity epoxy compounds include: cyclohexanedimethanol diglycidyl ether, resorcinol diglycidyl ether, p-tert-butylphenyl glycidyl ether, cresyl glycidyl ether, diglycidyl ether of neopentyl glycol, triglycidyl ether of trimethylolethane, triglycidyl ether of trimethylolpropane, triglycidylp-aminophenol, N,N'-diglycidylaniline, N,N,N',N'-tetraglycidyl meta-xylylenediamine, and vegetable oil polyglycidyl ether.

In some embodiments, the amount of the epoxy component is 1% by weight or greater, based on the total weight of the polymeric material, 5% by weight or greater, 7% by weight or greater, 10% by weight or greater, 12% by weight or greater, 15% by weight or greater, 18% by weight or greater; 21% by weight or greater, 24% by weight or greater, 26% by weight or greater, 31% by weight or greater, 36% by weight or greater, 41% by weight or greater, 45% by weight or greater, or 50% by weight or greater, based on the total weight of the polymeric material; and 95% by weight or less, 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 31% by weight or less, 29% by weight or less, 27% by weight or less, 25% by weight or less, 23% by weight or less, 20% by weight or less, 17% by weight or less, 14% by weight or less, or 10% by weight or less, based on the total weight of the polymeric material. In select embodiments, the epoxy component is added in an amount of 2 to 80% by weight, 5 to 70% by weight, or 10 to 60% by weight, based on the total weight of the polymeric material.

The components optionally include at least one accelerator, for instance a catalyst. Suitable catalysts include a bismuth carboxylate, for instance bismuth neodecanoate and/or bismuth ethylhexanoate. Typically, such catalysts can be included to accelerate reaction of the uretdione-containing material with one or more hydroxyl-containing compounds. In select embodiments, the components are free of catalysts that contain tin. Further suitable catalysts comprise Lewis acid salts, e.g., calcium triflate, calcium nitrate, and/or lanthanum nitrate, which can be useful when the optional epoxy component is present, for accelerating reaction of one or more of the components with the epoxy component.

The polymeric material may further comprise one or more additives, e.g., plasticizers, non-reactive diluents, toughening agents, fillers, flow control agents, colorants (e.g., pigments and dyes), adhesion promoters, UV stabilizers, flexibilizers, fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the tradename EXPANCEL by Expancel Inc. (Duluth, GA).

Suitable non-reactive diluents can include benzoate esters, for instance and without limitation ethyl benzoate, ethylhexyl benzoate, ethylhexyl hydroxystearate benzoate, $C_{12}$-$C_{15}$ alkyl benzoates, and dipropylene glycol dibenzoate. A commercially available non-reactive diluent includes the material available under the tradename BENZOFLEX 131 from Eastman Chemical (Kingsport, TN). Additionally, organic and/or inorganic acids can be utilized as retarders to delay the cure or extend the pot-life of the material. For example, suitable acids can include carboxylic acids.

A plasticizer is often added to a polymeric material to make the polymeric material more flexible, softer, and more workable (e.g., easier to process). More specifically, the mixture resulting from the addition of the plasticizer to the polymeric material typically has a lower glass transition temperature compared to the polymeric material alone. The glass transition temperature of a polymeric material can be lowered, for example, by at least 30 degrees Celsius, at least 40 degrees Celsius, at least 50 degrees Celsius, at least 60 degrees Celsius, or at least 70 degrees Celsius by the addition of one or more plasticizers. The temperature change (i.e., decrease) tends to correlate with the amount of plasticizer added to the polymeric material. It is the lowering of the glass transition temperature that usually leads to the increased flexibility, increased elongation, and increased workability. Some example plasticizers include various phthalate esters such as diethyl phthalate, diisobutyl phthalate, dibutyl phthalate, diisoheptyl phthalate, dioctyl phthalate, diisooctyl phthalate, dinonyl phthalate, diisononyl phthalate, diisodecyl phthalate, and benzylbutyl phthalate; various adipate esters such as di-2-ethylhexyl adipate, dioctyl adipate, diisononyl adipate, and diisodecyl adipate; various phosphate esters such as tri-2-ethylhexyl phosphate, 2-ethylhexyl diphenyl phosphate, trioctylphosphate, and tricresyl phosphate; various trimellitate esters such as tris-2-ethylhexyl trimellitate and trioctyl trimellitate; various sebacate and azelate esters; and various sulfonate esters. Other example plasticizers include polyester plasticizers that can be formed by a condensation reaction of propanediols or butanediols with adipic acid. Commercially available plasticizers include those available under the tradename JAYFLEX DINA available from ExxonMobil Chemical (Houston, TX) and PLASTOMOLL (e.g., diisononyl adipate) from BASF (Florham Park, NJ).

Another optional additive is a toughening agent. Toughening agents can be added to provide the desired overlap shear, peel resistance, and impact strength. Useful toughening agents are polymeric materials that may react with the epoxy resin and that may be cross-linked. Suitable toughening agents include polymeric compounds having both a rubbery phase and a thermoplastic phase or compounds which are capable of forming, with the epoxide resin, both a rubbery phase and a thermoplastic phase on curing. Polymers useful as toughening agents are preferably selected to inhibit cracking of the cured composition.

Some polymeric toughening agents that have both a rubbery phase and a thermoplastic phase are acrylic core-shell polymers wherein the core is an acrylic copolymer having a glass transition temperature below 0° C. Such core polymers may include polybutyl acrylate, polyisooctyl acrylate, polybutadiene-polystyrene in a shell comprised of an acrylic polymer having a glass transition temperature above 25° C., such as polymethylmethacrylate. Commercially available core-shell polymers include those available as a dry powder under the tradenames ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a predispersed blend with a diglycidyl ether of bisphenol A at, for example, a ratio of 12 to 37 parts by weight of the core-shell polymer and are available under the tradenames KANE ACE (e.g., KANE ACE MX 157, KANE ACE MX 257, and KANE ACE MX 125) from Kaneka Corporation (Japan).

Another class of polymeric toughening agents that are capable of forming, with the epoxy component, a rubbery phase on curing, are carboxyl-terminated butadiene acrylonitrile compounds. Commercially available carboxyl-terminated butadiene acrylonitrile compounds include those available under the tradenames HYCAR (e.g., HYCAR 1300X8, HYCAR 1300X13, and HYCAR 1300X17) from Lubrizol Advanced Materials, Inc. (Cleveland, Ohio) and under the tradename PARALOID (e.g., PARALOID EXL-2650) from Dow Chemical (Midland, MI).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is preferably prepared so as to constitute from 95 wt. % to 40 wt. % of the total graft polymer, so that the polymerized thermoplastic portion constitutes from 5 wt. % to 60 wt. % of the graft polymer.

Still other polymeric toughening agents are polyether sulfones such as those commercially available from BASF (Florham Park, NJ) under the tradename ULTRASON (e.g., ULTRASON E 2020 P SR MICRO).

Further optional additives include a flow control agent or thickener, to provide the desired rheological characteristics to the polymeric material. Suitable flow control agents include fumed silica, such as treated fumed silica, available under the tradename CAB-O-SIL TS 720, and untreated fumed silica available under the tradename CAB-O-SIL M5, from Cabot Corp. (Alpharetta, GA).

In some embodiments, the polymeric material optimally contains adhesion promoters other than the silane adhesion promoter to enhance the bond to the substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The polymeric material optionally may also contain one or more fillers (e.g., aluminum powder, carbon black, glass bubbles, talc, clay, calcium carbonate, barium sulfate, titanium dioxide, silica such as fused silica, silicates, glass beads, and mica). Particulate fillers can be in the form of flakes, rods, spheres, and the like.

The amount and type of such additives may be selected by one skilled in the art, depending on the intended end use of the composition.

In certain embodiments, the polymeric material is used in an application where it is disposed between two substrates, wherein solvent removal (e.g., evaporation) is restricted, especially when one or more of the substrates comprises a moisture impermeable material (e.g., steel or glass). In such cases, the polymeric material comprises a solids content of 90% or greater, 92% or greater, 94% or greater, 95% or greater, 96% or greater, 98% or greater, or 99% or greater. Likewise, in such embodiments where solvent removal is restricted, the first part, the second part, or both parts of a two-part composition according to the present disclosure comprises a solids content of 90% or greater, 92% or greater, 94% or greater, 95% or greater, 96% or greater, 98% or greater, or 99% or greater. Components that are considered "solids" include, for instance and without limitation, polymers, oligomers, monomers, hydroxyl-containing compounds, and additives such as plasticizers, catalysts, non-reactive diluents, and fillers. Typically, only solvents do not fall within the definition of solids, for instance water or organic solvents.

For convenient handleability, the polymeric material typically comprises a dynamic viscosity of 10 Poise (P) or greater as determined using a Brookfield viscometer, 50 P or greater, 100 P or greater, 150 P or greater, 250 P or greater, 500 P or greater, 1,000 P or greater, 1,500 P or greater, 2,000 P or greater, 2,500 P or greater, or even 3,000 P or greater; and 10,000 P or less, 9,000 P or less, 8,000 P or less, 7,000 P or less, 6,000 P or less, 5,000 P or less, or even 4,000 P or less, as determined using a Brookfield viscometer. Stated another way, the polymeric material may exhibit a dynamic viscosity of 10 Poise (P) to 10,000 P, inclusive, 10 P to 6,000 P, or 10 P to 4,000 P, inclusive, as determined using a Brookfield viscometer. Conditions for the dynamic viscosity test include use of a LV4 spindle at a speed of 0.3 or 0.6 revolutions per minute (RPM) at 24 degrees Celsius.

Compositions according to the present disclosure are often in the form of a two-part composition. Hence, in a second aspect, a two-part composition is provided. The two-part composition includes (1) a first part comprising a polymeric material including (a) a polymerized reaction product of a polymerizable composition comprising components and (b) an optional thermally activatable amine curative; and (2) a second part including (a) at least one liquid amine; and (b) an optional thermally activatable amine curative. At least one molecule of the at least one liquid amine has an average amine functionality of 2.0 or greater, and each amine includes a primary amine or a secondary amine. The thermally activatable amine curative is present in at least one of the first part or the second part and at least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (i) a uretdione-containing material comprising a reaction product of a diisocyanate reacted with itself; (ii) a first hydroxyl-containing compound having more than one OH group; and (iii) an optional second hydroxyl-containing compound having a single OH group. The optional second hydroxyl-containing compound is a primary alcohol or a secondary alcohol. Stated another way, the two-part composition includes:

(1) a first part comprising a polymeric material comprising:

(a) a polymerized reaction product of a polymerizable composition comprising components, the components comprising:

(i) a uretdione-containing material comprising a reaction product of a diisocyanate reacted with itself;

(ii) a first hydroxyl-containing compound having more than one OH group: and (iii) an optional second hydroxyl-containing compound having a single OH group, wherein the second hydroxyl-containing compound is a primary alcohol or a secondary alcohol; and (b) an optional thermally activatable amine curative;

wherein the polymeric material has an average uretdione ring functionality of at least 1.2 and wherein the polymeric material comprises a solids content of 90% or greater and (2) a second part comprising:

(a) at least one liquid amine, at least one molecule of the at least one liquid amine having an average amine functionality of 2.0 or greater, wherein each amine includes a primary amine or a secondary amine; and (b) an optional thermally activatable amine curative;

wherein the thermally activatable amine curative is present in at least one of the first part or the second part and wherein at least one molecule of the thermally activatable amine has an average amine functionality of 2.0 or greater.

The thermally activatable amine curative is optionally present in the second part in an amount of 5 to 90 percent by weight, based on the total weight of the second part, such as in an amount of 10 to 82 percent by weight.

In some embodiments, at least one amine of the liquid amine comprises a primary amine.

Typically, at least one accelerator (e.g., catalyst) is present in the first part, in the second part, or in each of the first part and the second part. Suitable accelerators are described in detail above with respect to the first part. One or more of these accelerators can be useful in increasing the speed of reaction or catalyzing a reaction of components of the first part with the second part.

Two-part compositions according to certain embodiments of the present disclosure use the basic chemical reaction from Scheme 3 below, e.g., a polymeric material comprising a uretdione-containing material and an (optional) epoxy component in one part of the system and a liquid amine in the other part of the system, as an initial first stage of cure. When the liquid amine is mixed with the uretdione-containing material and the optional epoxy component, the amine opens the uretdione to form a biuret and opens the epoxy ring. This produces an isocyanate-free coating or adhesive system according to Scheme 3:

Scheme 3

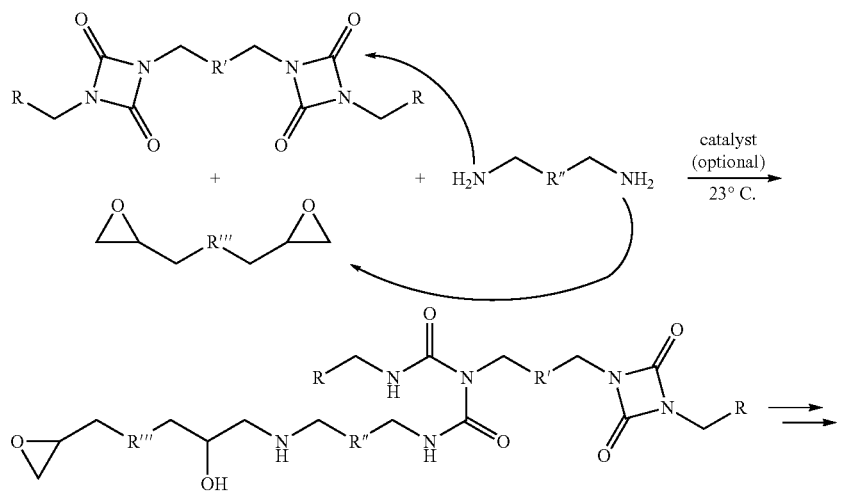

Preferably, the uretdione-containing material has an average isocyanate content of less than 0.1%.

The polymeric material also needs to have enough of a uretdione group functionality per molecule of polymeric material to allow for curing of a two-part composition into an effective polymer network when reacted with the amines. Typically, the polymeric material comprises an average of 1.3 to 6.0 inclusive, of a uretdione functional group in a backbone of the polymeric material. It is usually advantageous for the first part (e.g., the polymeric material, the first hydroxyl-containing compound, the epoxy compound, the accelerator, and the optional second hydroxyl-containing compound) to be flowable, (e.g., to allow for mixing with the second part) and to readily wet the surface of either a substrate to be coated or two substrates to be adhered. To provide a uretdione-containing polymeric material that has a relatively low viscosity at a high solids content, the composition of the polymeric material should have minimal crystallinity, which can be achieved through the inclusion of the reactive diluent epoxy component. In published reports, uretdione-containing materials used in solvent-borne coatings have had a molecular weight that is too high be practical in the adhesive systems having 90% or greater solids content without also including an epoxy component. Further, it has been found that the amount of diol in a first part of a two-part composition can be included in a range of about 0.2 to 0.65 (or 0.25 to 0.61) equivalents relative to the isocyanate equivalents to achieve a suitable viscosity and a sum of the OH equivalents of the first hydroxyl-containing compound and the optional second hydroxyl-containing compound is equal to or greater than the isocyanate equivalents of the polymeric material.

Polymeric materials according to the present disclosure should be paired with second parts having liquid amines with a functionality that is greater than 2.0, to produce better properties, such as adhesive strength and gel content. Previous reports, for instance, teach that primary amines give a rapid cure of uretdione-containing material that limits pot life, and it has been found that that is the case with certain amines, such as diethylenetriamine and other ethylenediamine oligomers. Interestingly, it has been found that polymeric materials according to the present disclosure cure to a soft, poorly crosslinked material when cured with certain diamines. However, it has also been found that amine-terminated polyethers (e.g., available under the trade name "JEFFAMINE" commercially available from Huntsman (The Woodlands, TX)) produce an acceptable rate of cure, particularly when they are primary amines. Trifunctional JEFFAMINE amines, such as JEFFAMINE T403, have been found to produce particularly good performance in adhesive systems according to the present disclosure. Difunctional JEFFAMINE amines, such as JEFFAMINE D230, D400, AND THF-100, have also been found to produce good performance in adhesive systems according to the present disclosure. Extremely high molecular weight amines tend to not provide good miscibility with the polymeric material of the first part, however, and in some cases the apparent phase separation of the uretdione-containing material and the liquid amine curing agent tends to prevent effective cure. The relatively high molecular weight of JEFFAMINE curing agents provide another advantage over small-molecule diamines: the JEFFAvIINES require a weight ratio between the curing agent and the uretdione-containing material that is higher, and a balanced mixture ratio (e.g., the more closely it approaches 50 wt. % of each component) is often more convenient for two-part compositions.

The one or more liquid amines present in the second part preferably have an average amine functionality of 2.0 or greater, 2.1 or greater, 2.2 or greater, 2.3 or greater, 2.4 or greater, 2.5 or greater, 2.6 or greater, 2.7 or greater, 2.8 or greater, 2.9 or greater, 3.0 or greater, 3.1 or greater, 3.2 or greater, 3.3 or greater, 3.4 or greater, or even 3.5 or greater; and an average amine functionality of 4.0 or less. The average amine functionality of 2.0 or greater tends to result in more desirable properties of the polymerized product after curing with the amine curing agent, such as gel content and adhesive strength. Moreover, the average amine functionality may be selected based on whether a desired application requires, e.g., stiffness versus elasticity; or high $T_g$ versus low $T_g$. The "average amine functionality" is the average number of primary or secondary amine nitrogen atoms per molecule.

In certain embodiments, the second part includes a diamine or a triamine, such as a difunctional amine-terminated polyether or a trifunctional amine-terminated polyether, respectively. Another suitable liquid amine for use in the second part comprises a phenalkamine, 4,7,10-trioxatridecane-1,13-diamine, or a reaction product of epichlorohydrin with 1,3-benzenedimethanamine. For instance, a reaction product of epichlorohydrin with 1,3-benzenedimethanamine is commercially available under the trade designation GASKAMINE 328 from Mitsubishi Gas Chemical Company (New York, New York). Exemplary amines include for instance, solvent-free phenalkamine available under the trade designation CARDOLITE 5607 from Cardolite Corporation (Monmouth Junction, New Jersey) and a reactive liquid polyamide available under the trade designation ANCAMIDE 350A from Evonik Industries (Essen, Germany).

The at least one liquid amine often comprises a molecular weight of 5,000 grams per mole (g/mole) or less, 3,000 g/mole or less, 2,000 g/mole or less, 1,500 g/mole or less, 1,400 g/mole or less, 1,200 g/mole or less, or even 1,000 g/mole or less.

Preferably, the second part exhibits a viscosity of 0.1 Poise (P) to 10,000 P, inclusive, 0.1 Poise (P) to 5,000 P, inclusive, or 0.1 Poise (P) to 1,000 P, inclusive, as determined using a Brook-field viscometer.

It has been discovered that it is possible to provide two-part compositions (according to at least certain embodiments of the present disclosure) that are 90% or greater solids and exhibit each of 1) good flowability; 2) acceptable extent of cure; and 3) curing in a relatively short amount of time. Adhesive two-part compositions can further exhibit 4) acceptable adhesion strength following curing. In certain embodiments, the first part and the second part are each flowable at 20° C.

The uretdione-containing material is typically kept separate from the curing agent prior to use of the polymerizable composition. That is, the uretdione-containing material is typically in a first part and the liquid amine is typically in a second part of the polymerizable composition. The first part can include other components that do not react with the uretdione-containing material (or that react with only a portion of the uretdione-containing material). Likewise, the second part can include other components that do not react with the liquid amine curing agent or that react with only a portion of the liquid amine curative. Two different amine curatives are used that have distinct reactivity profiles. The introduction of two different amine curatives allows for a two-stage cure of the material. Advantageously, the first (i.e., liquid) amine curative reacts rapidly and allows for rapid generation of green strength and an increase in viscosity that contributes to non-sag behavior of the material (e.g., Scheme 3 above). This is followed by a long period of low to moderate strength that enables re-workability and/or delayed bonding. After the addition of heat, activation and reaction of the second amine curative (i.e., thermally activatable amine curative) assists in the material reaching its full cured strength.

When the first part and the second part are mixed together, the various components react to form the reaction product, for instance as shown below in the general reaction Scheme 4, in which the optional epoxy component is present:

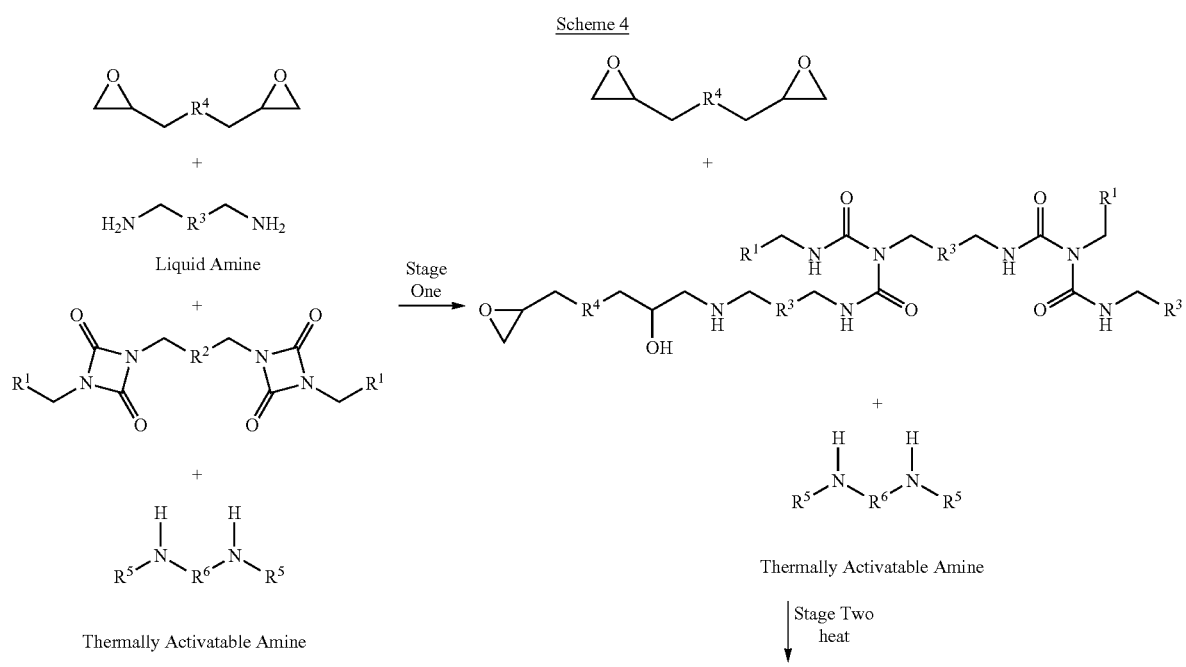

-continued

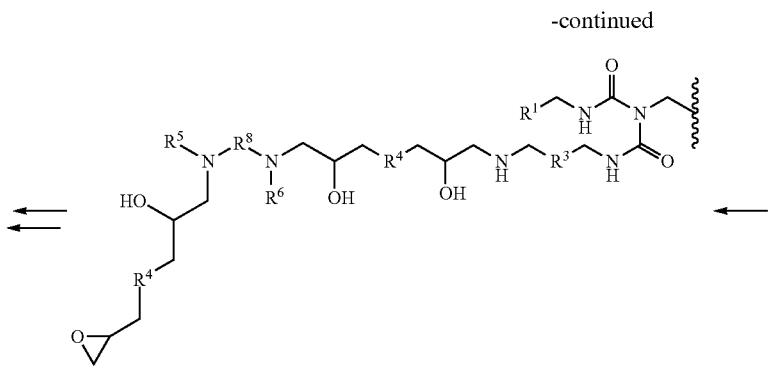

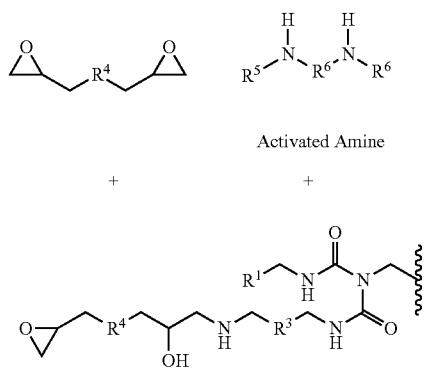

Activated Amine

In a third aspect, a polymerized product is provided. The polymerized product is the polymerized product of any of the two-part compositions according to the second aspect described above. The polymerized product typically coats at least a portion of a substrate, and up to the entire surface of a substrate depending on the application. When the polymerized product acts as an adhesive, often the polymerized product is disposed between two substrates (e.g., adhering the two substrates together). Advantageously, the polymerized product of at least some embodiments of the disclosure is suitable for use when at least one substrate comprises a moisture impermeable material, due to the high solids content of the polymerizable composition. Hence, in certain embodiments at least one substrate is made of a metal (e.g., steel), a glass, a wood, a ceramic, or a polymeric material. The polymerized product may also be employed with one or more substrates that have moisture permeability, for instance but without limitation, woven materials, nonwoven materials, paper, foams, membranes, and polymeric films.

In a fourth aspect, a method of adhering two substrates is provided. Referring to FIG. 1, the method includes obtaining a two-part composition 110; combining at least a portion of the first part with at least a portion of the second part to form a mixture 120; disposing at least a portion of the mixture on a first major surface of a first substrate 130; and contacting a first major surface of a second substrate with the mixture disposed on the first substrate 140. The method includes (a) obtaining a two-part composition; (b) combining at least a portion of the first part with at least a portion of the second part to form a mixture; (c) disposing at least a portion of the mixture on a first major surface of a first substrate; and (d) contacting a first major surface of a second substrate with the mixture disposed on the first substrate. The two-part composition includes (1) a first part comprising a polymeric material including (a) a polymerized reaction product of a polymerizable composition comprising components and (b) an optional thermally activatable amine curative; and (2) a second part including (a) at least one liquid amine; and (b) an optional thermally activatable amine curative. At least one molecule of the at least one liquid amine has an average amine functionality of 2.0 or greater, and each amine includes a primary amine or a secondary amine. The thermally activatable amine curative is present in at least one of the first part or the second part and at least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (i) a uretdione-containing material comprising a reaction product of a diisocyanate reacted with itself; (ii) a first hydroxyl-containing compound having more than one OH group; and (iii) an optional second hydroxyl-containing compound having a single OH group. The optional second hydroxyl-containing compound is a primary alcohol or a secondary alcohol.

Referring again to FIG. 1, the method optionally further comprises securing the first substrate to the second substrate (e.g., with one or more mechanical clamps, under a weighted object, etc.) and allowing the mixture to cure to form an adhesive adhering the first substrate and the second substrate together 150. The method optionally further comprises allowing the mixture to cure for at least 1 hour at ambient temperature to form an adhesive adhering the first substrate and the second substrate together 160. Additionally, the method optionally comprises subjecting the mixture to a temperature of 45° C. or higher 170 (or 60° C. or higher), to activate the thermally activatable amine curative. As indicated by the various arrows connecting steps 130, 140, 150, 160, and/or 170, the order of certain steps can be selected for a particular application, and one or more of the optional steps might be performed.

In contrast to some other available two-part compositions that are recommended to be allowed to cure at ambient temperature to achieve handling strength for at least 4 hours, 6 hours, 8 hours, 10 hours, or 12 hours (or at least 1 day, at least 2 days, at least 4 days, or at least 1 week), the present disclosure provides two-part compositions that offer two stages for curing. In some embodiments, the first, ambient temperature cure step begins upon mixing and can be allowed to proceed for 1 hour or more, 2 hours or more, 3 hours or more, 4 hours or more, 6 hours or more, 8 hours or more, 10 hours or more, 24 hours or more, or 72 hours or more; and up to 3 months, up to 2 months, up to 1 month, up to 2 weeks, or up to 1 week. In some embodiments, a second cure stage is performed by subjecting the mixture to a temperature of 45° C. or higher, 60° C. or higher, or 80° C. or higher, thereby activating the thermally activatable curative.

Stated another way, a method of adhering two substrates together comprises:
(a) obtaining a two-part composition, the two-part composition comprising:
(1) a first part comprising a polymeric material comprising:
(A) a polymerized reaction product of a polymerizable composition comprising components, the components comprising:
(i) a uretdione-containing material comprising a reaction product of a diisocyanate reacted with itself;

(ii) a first hydroxyl-containing compound having more than one OH group; and (iii) an optional second hydroxyl-containing compound having a single OH group, wherein the second hydroxyl-containing compound is a primary alcohol or a secondary alcohol; and (B) an optional thermally activatable amine curative;

wherein the polymeric material has an average uretdione ring functionality of at least 1.2 and wherein the polymeric material comprises a solids content of 90% or greater; and (2) a second part comprising:

(A) at least one liquid amine, at least one molecule of the at least one liquid amine having an average amine functionality of 2.0 or greater, wherein each amine comprises a primary amine or a secondary amine; and (B) an optional thermally activatable amine curative;

wherein the thermally activatable amine curative is present in at least one of the first part or the second part and wherein at least one molecule of the thermally activatable amine has an average amine functionality of 2.0 or greater;

(b) combining at least a portion of the first part with at least a portion of the second part to form a mixture;

(c) disposing at least a portion of the mixture on a first major surface of a first substrate; and (d) contacting a first major surface of a second substrate with the mixture disposed on the first substrate.

Typically, at least one accelerator (e.g., catalyst) is present in the first part, in the second part, or in each of the first part and the second part. Suitable accelerators are described in detail above with respect to the first part. One or more of these accelerators can be useful in increasing the speed of reaction or catalyzing a reaction of components of the first part with the second part.

Depending on the particular application, an amount of each of the first part and the second part obtained will vary; in certain embodiments, an excess of one or both of the first part and the second part is obtained and hence only a portion of one or both of the first part and the second part, respectively, will be combined to form a mixture. In other embodiments, however, a suitable amount of each of the first part and the second part for adhering the first and second substrates together is obtained and essentially all of the first part and the second part is combined to form the mixture. In certain embodiments, combining a (e.g., predetermined) amount of the first part with a (e.g., predetermined) amount of the second part is performed separately from the first and second substrates, while in other embodiments the combining is performed (e.g., directly) on the first major surface of a substrate.

The mixture is typically applied to (e.g., disposed on) the surface of the substrate using conventional techniques such as, for example, dispensing, bar coating, roll coating, curtain coating, rotogravure coating, knife coating, spray coating, spin coating, or dip coating techniques. Coating techniques such as bar coating, roll coating, and knife coating are often used to control the thickness of a layer of the mixture. In certain embodiments, the disposing comprises spreading the mixture on the first major surface of the first substrate, for instance when the mixture is dispensed (e.g., with a nozzle, etc.) on the surface of the substrate such that the mixture does not cover the entirety of a desired area.

Figure 2:
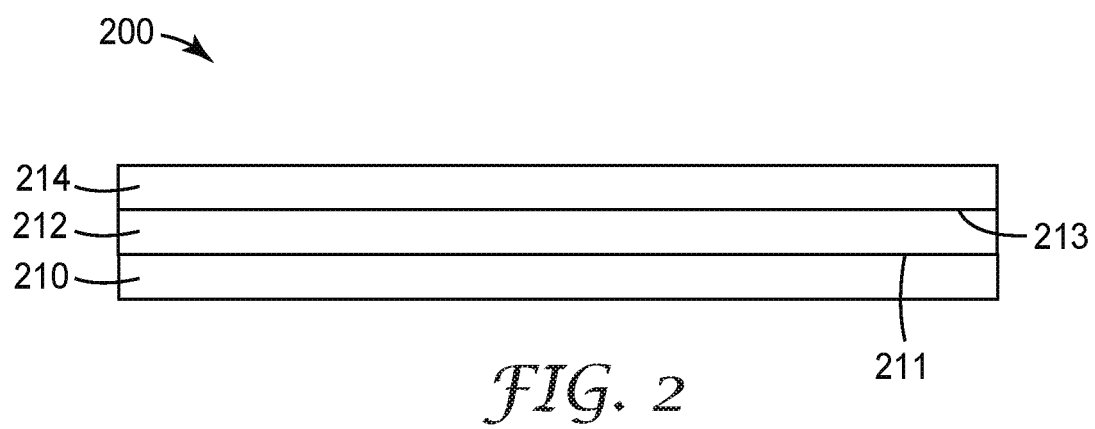
FIG. 2 is a schematic cross-sectional view of an exemplary article including two substrates adhered together, preparable according to the present disclosure.

Referring to FIG. 2, a schematic cross-section of an article 200 is illustrated. The article 200 comprises a mixture 212 (e.g., an adhesive) disposed on a first major surface 211 of a first substrate 210. The article 200 further comprises a first major surface 213 of a second substrate 214 in contact with (e.g., adhered to) the mixture 212 disposed on the first substrate 210.

Advantageously, the two-part compositions according to at least certain embodiments of the present disclosure are capable of providing at least a minimum adhesion of two substrates together. Following cure, the adhesive preferably exhibits a minimum overlap shear on aluminum of 0.1 megaPascals (MPa), 0.3 MPa, 1 MPa, 5 MPa, 10 MPa, 25 MPa, or 50 MPa. A suitable test for determining the minimum overlap shear is described in the Examples below.

In a fifth aspect, a method of curing a two-part composition is provided. The method includes (a) obtaining a two-part composition; (b) combining at least a portion of the first part with at least a portion of the second part to form a mixture; and (c) subjecting the mixture to a temperature of 45° C. or higher to provide a polymerized reaction product of the mixture. The two-part composition includes (1) a first part comprising a polymeric material including (a) a polymerized reaction product of a polymerizable composition comprising components and (b) an optional thermally activatable amine curative; and (2) a second part including (a) at least one liquid amine; and (b) an optional thermally activatable amine curative. At least one molecule of the at least one liquid amine has an average amine functionality of 2.0 or greater, and each amine includes a primary amine or a secondary amine. The thermally activatable amine curative is present in at least one of the first part or the second part and at least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (i) a uretdione-containing material comprising a reaction product of a diisocyanate reacted with itself; (ii) a first hydroxyl-containing compound having more than one OH group; and (iii) an optional second hydroxyl-containing compound having a single OH group. The optional second hydroxyl-containing compound is a primary alcohol or a secondary alcohol.

Stated another way, a method of curing a two-part composition comprises:

(a) providing a two-part composition, the two-part composition comprising:

(1) a first part comprising a polymeric material comprising:

(A) a polymerized reaction product of a polymerizable composition comprising components, the components comprising:

(i) a uretdione-containing material comprising a reaction product of a diisocyanate reacted with itself;

(ii) a first hydroxyl-containing compound having more than one OH group; and (iii) an optional second hydroxyl-containing compound having a single OH group, wherein the second hydroxyl-containing compound is a primary alcohol or a secondary alcohol; and (B) an optional thermally activatable amine curative;

wherein the polymeric material has an average uretdione ring functionality of at least 1.2 and wherein the polymeric material comprises a solids content of 90% or greater and (2) a second part comprising:

(A) at least one liquid amine, at least one molecule of the at least one liquid amine having an average amine functionality of 2.0 or greater, wherein each amine comprises a primary amine or a secondary amine; and (B) an optional thermally activatable amine curative; wherein the thermally activatable amine curative is present in at least one of the first part or the second part and wherein at least one molecule of the thermally activatable amine has an average amine functionality of 2.0 or greater;

(b) combining at least a portion of the first part with at least a portion of the second part to form a mixture; and (c) subjecting the mixture to a temperature of 45° C. or higher to provide a polymerized reaction product of the mixture.

Optionally, the mixture is disposed on a first major surface of a substrate prior to step (c) including heating the mixture.

The components of the first part are as described above with respect to the first aspect and the second part is as described above with respect to the second aspect. Typically, at least one accelerator (e.g., catalyst) is present in the first part, in the second part, or in each of the first part and the second part. Suitable accelerators are described in detail above with respect to the first part.

Select Embodiments of the Disclosure

Embodiment 1 is a polymeric material. The polymeric material includes a polymerized reaction product of a polymerizable composition, and a thermally activatable amine curative. At least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (a) a uretdione-containing material comprising a reaction product of a diisocyanate reacted with itself; (b) a first hydroxyl-containing compound having more than one OH group; and (c) an optional second hydroxyl-containing compound having a single OH group. The optional second hydroxyl-containing compound is a primary alcohol or a secondary alcohol.

Embodiment 2 is the polymeric material of embodiment 1, wherein components (a), (b), and, if present, (c), are reacted, and then the thermally activatable amine curative is combined with the reaction product of components (a), (b), and, if present, (c).

Embodiment 3 is the polymeric material of embodiment 1 or embodiment 2, further including an acidic stabilizer.

Embodiment 4 is the polymeric material of embodiment 3, wherein the acidic stabilizer is selected from the group consisting of $BF_3$, $C_1$-$C_{16}$ monocarboxylic acids, $C_1$-$C_{16}$ dicarboxylic acids, $C_6$-$C_{14}$ arylcarboxylic acids, $C_1$-$C_{16}$ monosulfonic acids, $C_1$-$C_{16}$ disulfonic acids, $C_6$-$C_{14}$ arylsulfonic acids, $C_1$-$C_{16}$ monophosphonic acids, $C_1$-$C_{16}$ diphosphonic acids, $C_6$-$C_{14}$ arylphosphonic acids, and combinations thereof.

Embodiment 5 is the polymeric material of any of embodiments 1 to 4, further including an accelerator including a catalyst.

Embodiment 6 is the polymeric material of embodiment 5, wherein the accelerator includes a catalyst for reacting the uretdione-containing material with the first-hydroxyl-containing compound and, if present, with the second hydroxyl-containing compound.

Embodiment 7 is the polymeric material of embodiment 6, wherein the catalyst includes a bismuth carboxylate.

Embodiment 8 is the polymeric material of embodiment 7, wherein the bismuth carboxylate is bismuth neodecanoate or bismuth ethylhexanoate.

Embodiment 9 is the polymeric material of any of embodiments 1 to 8, further including an epoxy component.

Embodiment 10 is the polymeric material of embodiment 9, wherein the epoxy component is present in an amount of 2 to 80% by weight, 5 to 70% by weight, or 10 to 50% by weight, based on the total weight of the polymeric material.

Embodiment 11 is the polymeric material of embodiment 9 or embodiment 10, further including an accelerator including a catalyst for reacting with the epoxy component.

Embodiment 12 is the polymeric material of embodiment 11, wherein the catalyst includes a Lewis acid salt.

Embodiment 13 is the polymeric material of embodiment 12, wherein the Lewis acid salt includes calcium triflate, calcium nitrate, or lanthanum nitrate.

Embodiment 14 is the polymeric material of any of embodiments 1 to 13, wherein the uretdione-containing material is present in an amount of 10% by weight or greater, based on the total weight of the polymeric material, 20% by weight or greater, 30% by weight or greater. 40% by weight or greater, or 50% by weight or greater, based on the total weight of the polymeric material.

Embodiment 15 is the polymeric material of any of embodiments 1 to 14, wherein the thermally activatable amine curative is present in an amount of 0.5 to 30% by weight, based on the total weight of the polymeric material.

Embodiment 16 is the polymeric material of any of embodiments 1 to 15, wherein the polymeric material is in the form of a liquid.

Embodiment 17 is a two-part composition. The two-part composition includes (1) a first part comprising a polymeric material including (a) a polymerized reaction product of a polymerizable composition comprising components and (b) an optional thermally activatable amine curative; and (2) a second part including (a) at least one liquid amine; and (b) an optional thermally activatable amine curative. At least one molecule of the at least one liquid amine has an average amine functionality of 2.0 or greater, and each amine includes a primary amine or a secondary amine. The thermally activatable amine curative is present in at least one of the first part or the second part and at least one molecule of the thermally activatable amine has an average amine functionality of 2.0 or greater. The polymeric material has an average uretdione ring functionality of at least 1.2 and the polymeric material has a solids content of 90% or greater. The polymerized reaction product of a polymerizable composition includes components including (i) a uretdione-containing material comprising a reaction product of a diisocyanate reacted with itself; (ii) a first hydroxyl-containing compound having more than one OH group; and (iii) an optional second hydroxyl-containing compound having a single OH group. The optional second hydroxyl-containing compound is a primary alcohol or a secondary alcohol.

Embodiment 18 is the two-part composition of embodiment 17, wherein at least one amine of the liquid amine includes a primary amine.

Embodiment 19 is the two-part composition of embodiment 17 or embodiment 18, wherein the thermally activatable amine curative is present in the first part and wherein components (i), (ii), and, if present, (iii), of the first part are reacted, and then the thermally activatable amine curative is combined with the reaction product of components (i). (ii), and, if present, (iii).

Embodiment 20 is the two-part composition of any of embodiments 17 to 19, wherein the first part further includes an acidic stabilizer.

Embodiment 21 is the two-part composition of embodiment 20, wherein the acidic stabilizer is selected from the group consisting of $BF_3$, $C_1$-$C_{16}$ monocarboxylic acids, $C_1$-$C_{16}$ dicarboxylic acids, $C_6$-$C_{14}$ arylcarboxylic acids, $C_1$-$C_{16}$ monosulfonic acids, $C_1$-$C_{16}$ disulfonic acids, $C_6$-$C_{14}$ arylsulfonic acids, $C_1$-$C_{16}$ monophosphonic acids, $C_1$-$C_{16}$ diphosphonic acids, $C_6$-$C_{14}$ arylphosphonic acids, and combinations thereof.

Embodiment 22 is the two-part composition of any of embodiments 17 to 21, wherein at least one of the first part or the second part further includes an accelerator comprising a catalyst.

Embodiment 23 is the two-part composition of embodiment 22, wherein the accelerator is present in the first part and includes a catalyst for reacting the uretdione-containing material with the first-hydroxyl-containing compound and, if present, with the second hydroxyl-containing compound.

Embodiment 24 is the two-part composition of embodiment 23, wherein the catalyst includes a bismuth carboxylate.

Embodiment 25 is the two-part composition of embodiment 24, wherein the bismuth carboxylate is bismuth neodecanoate or bismuth ethylhexanoate.

Embodiment 26 is the two-part composition of any of embodiments 17 to 25, wherein the uretdione-containing material is present in an amount of 10% by weight or greater, based on the total weight of the polymeric material, 20% by weight or greater, 30% by weight or greater, 40% by weight or greater, or 50% by weight or greater, based on the total weight of the polymeric material.

Embodiment 27 is the two-part composition of any of embodiments 17 to 26, wherein the thermally activatable amine curative is present in the first part in an amount of 0.5 to 30% by weight, based on the total weight of the polymeric material.

Embodiment 28 is the two-part composition of any of embodiments 17 to 27, wherein the second hydroxyl-containing compound is present and is an alkyl alcohol, a polyester alcohol, or a polyether alcohol.

Embodiment 29 is the two-part composition of any of embodiments 17 to 28, wherein the first hydroxyl-containing compound is an alkylene polyol, a polyester polyol, or a polyether polyol.

Embodiment 30 is the two-part composition of any of embodiments 17 to 29, wherein the uretdione-containing material includes a compound of Formula I:

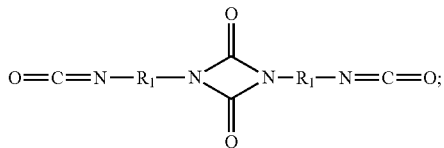

wherein $R_1$ is independently a $C_4$ to $C_{14}$ alkylene, arylene, and alkarylene.

Embodiment 31 is the two-part composition of any of embodiments 17 to 30, wherein the second hydroxyl-containing compound is present and is of Formula VII:

$$R_{13}\text{—OH} \qquad \text{VII;}$$

wherein $R_{13}$ is selected from $R_{14}$, $R_{15}$, and a $C_1$ to $C_{50}$ alkyl;

wherein $R_{14}$ is of Formula VIII:

wherein m=1 to 20, $R_{16}$ is an alkyl, and $R_{17}$ is an alkylene;
wherein $R_{15}$ is of Formula IX:

wherein n=1 to 20, $R_{18}$ is an alkyl, and $R_{19}$ is an alkylene.

Embodiment 32 is the two-part composition of any of embodiments 17 to 31, wherein the first hydroxyl-containing compound is of Formula II:

$$\text{HO—}R_2\text{—OH} \qquad \text{II;}$$

wherein $R_2$ is selected from $R_3$, an alkylene, and an alkylene substituted with an OH group, wherein $R_3$ is of Formula III or Formula IV:

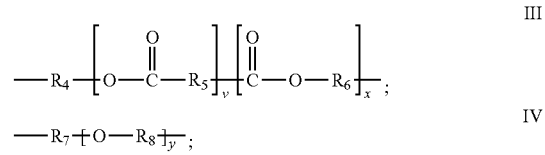

wherein each of $R_4$, $R_5$, $R_6$, $R_7$, and $R_8$ is independently an alkylene, wherein each of v and y is independently 1 to 40, and wherein x is selected from 0 to 40.

Embodiment 33 is the two-part composition of embodiment 32, wherein $R_2$ is selected from a $C_1$ to $C_{20}$ alkylene and a $C_1$ to $C_{20}$ alkylene substituted with an OH group.

Embodiment 34 is the two-part composition of embodiment 32 or embodiment 33, wherein each of $R_4$, $R_5$, $R_6$, $R_7$, and $R_8$ is independently a $C_1$ to $C_{20}$ alkylene.

Embodiment 35 is the two-part composition of any of embodiments 17 to 31, wherein the first hydroxyl-containing compound is of Formula V or Formula VI:

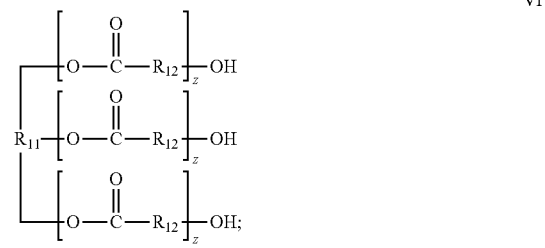

wherein each of $R_9$ and $R_{11}$ is independently an alkane-triyl, wherein each of $R_{10}$ and $R_{12}$ is independently an alkylene and wherein each of w and z is independently 1 to 20.

Embodiment 36 is the two-part composition of embodiment 35, wherein each of $R_{10}$ and $R_{12}$ is independently a $C_1$ to $C_{20}$ alkylene.

Embodiment 37 is the two-part-composition of any of embodiments 17 to 36, including an average of 1.3 to 6.0, inclusive, or 1.5 to 4.0, inclusive, of a uretdione functional group in a backbone of the polymeric material.

Embodiment 38 is the two-part composition of any of embodiments 17 to 37, wherein the polymeric material has a solids content of 94% or greater or 98% or greater.

Embodiment 39 is the two-part composition of any of embodiments 17 to 38, including an average of 0.2 to 18, inclusive, of a carbamate functional group in a backbone of the polymeric material.

Embodiment 40 is the two-part composition of any of embodiments 17 to 39, wherein the polymeric material is essentially free of isocyanates.

Embodiment 41 is the two-part composition of any of embodiments 17 to 40, wherein the polymeric material includes an average of 1.3 or fewer isocyanurate units per molecule of the polymeric material.

Embodiment 42 is the two-part composition of any of embodiments 17 to 41, wherein the diisocyanate includes hexamethylene diisocyanate.

Embodiment 43 is the two-part composition of any of embodiments 17 to 41, wherein the diisocyanate includes a functional group selected from Formula X, Formula XI, and Formula XII:

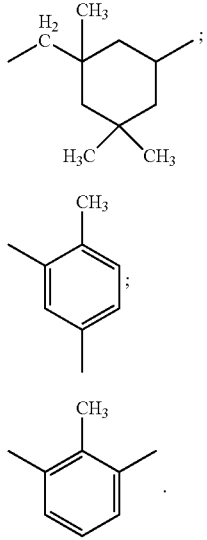

Embodiment 44 is the two-part composition of any of embodiments 17 to 43, wherein the first part exhibits a dynamic viscosity of 10 Poise (P) to 100,000 P, inclusive, 10 P to 10,000 P, inclusive, or 10 P to 6,000 P, inclusive, as determined using a Brookfield viscometer.

Embodiment 45 is the two-part composition of any of embodiments 17 to 44, further including a plasticizer, a non-reactive diluent, or a combination thereof.

Embodiment 46 is the two-part composition of any of embodiments 17 to 45, wherein the first part further comprises an epoxy component.

Embodiment 47 is the two-part composition of embodiment 46, wherein the epoxy component is present in an amount of 2 to 80% by weight, 5 to 70% by weight, or 10 to 60% by weight, based on the total weight of the polymeric material.

Embodiment 48 is the two-part composition of embodiment 46 or embodiment 47, wherein at least one of the first part or the second part further includes an accelerator comprising a catalyst for reacting with the epoxy component.

Embodiment 49 is the two-part composition of embodiment 48, wherein the catalyst includes a Lewis acid salt.

Embodiment 50 is the two-part composition of embodiment 49, wherein the Lewis acid salt includes calcium triflate, calcium nitrate, or lanthanum nitrate.

Embodiment 51 is the two-part composition of any of embodiments 46 to 50, wherein the epoxy component includes at least one multifunctional epoxy.

Embodiment 52 is the two-part composition of any of embodiments 46 to 51, wherein the epoxy component includes at least one trifunctional epoxy.

Embodiment 53 is the two-part composition of any of embodiments 46 to 52, wherein the epoxy component includes at least one glycidyl ether group.

Embodiment 54 is the two-part composition of any of embodiments 46 to 53, wherein at least one epoxy component has a molecular weight of 2,000 grams per mole or less.

Embodiment 55 is the two-part composition of any of embodiments 46 to 54, wherein the epoxy component exhibits a dynamic viscosity of 100,000 centipoises (P) or less, 50,000 cP or less, or 20,000 cP or less, as determined using a Brookfield viscometer.

Embodiment 56 is the two-part composition of any of embodiments 46 to 55, wherein the epoxy component includes an aliphatic epoxy.

Embodiment 57 is the two-part composition of any of embodiments 17 to 56, further including at least one additive selected from a toughening agent, a filler, a flow control agent, an adhesion promoter, a colorant, a UV stabilizer, a flexibilizer, a fire retardant, an antistatic material, a thermally and/or electrically conductive particle, or an expanding agent.

Embodiment 58 is the two-part composition of any of embodiments 17 to 57, wherein the second hydroxyl-containing compound is present and is selected from 2-butanol, 2-ethyl-1-hexanol, isobutanol, and 2-butyl-octanol.

Embodiment 59 is the two-part composition of any of embodiments 17 to 58, wherein the first hydroxyl-containing compound is selected from 2,2-dimethyl-1,3-propanediol, 2-methyl-1,3-propanediol, diethylene glycol, poly(tetramethylene ether) glycol, 2-ethylhexane-1,3-diol, and 1,3-butanediol.

Embodiment 60 is the two-part composition of any of embodiments 17 to 34 or 37 to 59, wherein the second hydroxyl-containing compound is present and is of Formula VII and the first hydroxyl-containing compound is of Formula II, wherein $R_2$ of the compound of Formula II is of Formula III, and wherein $R_{13}$ of the compound of Formula VII is a branched $C_4$ to $C_{20}$ alkyl.

Embodiment 61 is the two-part composition of any of embodiments 17 to 60, wherein a sum of the OH equivalents of the first hydroxyl-containing compound and the second hydroxyl-containing compound is equal to or greater than the isocyanate equivalents of the polymeric material.

Embodiment 62 is the two-part composition of any of embodiments 17 to 61, wherein the first hydroxyl-containing compound is a diol and the reaction product includes 0.2 to 0.65, inclusive, or 0.25 to 0.61, inclusive, of diol equivalents relative to isocyanate equivalents.

Embodiment 63 is the two-part composition of any of embodiments 17 to 62, wherein the first hydroxyl-containing compound includes a branched diol.

Embodiment 64 is the two-part composition of any of embodiments 17 to 63, wherein the second hydroxyl-containing compound is present and includes a branched alcohol.

Embodiment 65 is the two-part composition of any of embodiments 17 to 64, wherein the second hydroxyl-containing compound is present and includes a secondary alcohol.

Embodiment 66 is the two-part composition of any of embodiments 17 to 65, wherein at least one molecule of the at least one liquid amine has an average amine functionality of 4.0 or less.

Embodiment 67 is the two-part composition of any of embodiments 17 to 66, wherein the at least one liquid amine has an average amine functionality of 2.4 or greater.

Embodiment 68 is the two-part composition of any of embodiments 17 to 67, wherein the at least one liquid amine includes a primary amine including a phenalkamine, 4,7,10-trioxatridecane-1,13-diamine, a reaction product of epichlorohydrin with 1,3-benzenedimethanamine, or combinations thereof.

Embodiment 69 is the two-part composition of any of embodiments 17 to 68, wherein the at least one liquid amine includes a triamine.

Embodiment 70 is the two-part composition of any of embodiments 17 to 69, wherein the at least one liquid amine includes an amine-terminated polyether.

Embodiment 71 is the two-part composition of any of embodiments 17 to 70, wherein the at least one liquid amine includes a difunctional or trifunctional amine-terminated polyether.

Embodiment 72 is the two-part composition of any of embodiments 17 to 71, wherein the at least one liquid amine includes a reaction product of epichlorohydrin with 1,3-benzenedimethanamine.

Embodiment 73 is the two-part composition of any of embodiments 17 to 72, wherein the at least one liquid amine has a molecular weight of 2,000 grams per mole or less.

Embodiment 74 is the two-part composition of any of embodiments 17 to 73, wherein the second part has a solids content of 90% or greater, 94% or greater, or 98% or greater.

Embodiment 75 is the two-part composition of any of embodiments 17 to 74, wherein the second part exhibits a viscosity of 0.1 Poise (P) to 10,000 P, inclusive, 0.1 Poise (P) to 5,000 P, inclusive, or 0.1 Poise (P) to 1,000 P, inclusive, as determined using a Brookfield viscometer.

Embodiment 76 is the two-part composition of any of embodiments 17 to 75, wherein the first part is in the form of a liquid.

Embodiment 77 is a polymerized product of the two-part composition of any of embodiments 17 to 76.

Embodiment 78 is the polymerized product of embodiment 77, wherein the polymerized product coats at least a portion of a substrate.

Embodiment 79 is the polymerized product of embodiment 77 or embodiment 78, wherein the polymerized product is disposed between two substrates.

Embodiment 80 is the polymerized product of embodiment 78 or embodiment 79, wherein at least one substrate includes a moisture impermeable material.

Embodiment 81 is the polymerized product of any of embodiments 78 to 80, wherein at least one substrate is made of a metal.

Embodiment 82 is a method of adhering two substrates together. The method includes (a) obtaining the two-part composition of any of embodiments 17 to 76; (b) combining at least a portion of the first part with at least a portion of the second part to form a mixture; (c) disposing at least a portion of the mixture on a first major surface of a first substrate; and (d) contacting a first major surface of a second substrate with the mixture disposed on the first substrate.

Embodiment 83 is the method of embodiment 82, further including securing the first substrate to the second substrate and allowing the mixture to cure to form an adhesive adhering the first substrate and the second substrate together.

Embodiment 84 is the method of embodiment 82 or embodiment 83, further including allowing the mixture to cure for at least 3 hours at ambient temperature to form an adhesive adhering the first substrate and the second substrate together.

Embodiment 85 is the method of embodiment 82 or embodiment 83, further including subjecting the mixture to a temperature of 45° C. or higher or 60° C. or higher to post-cure the mixture.

Embodiment 86 is the method of any of embodiments 83 to 85, wherein the adhesive exhibits a minimum overlap shear on aluminum of 0.1 megaPascals (MPa) or 0.3 MPa.

Embodiment 87 is the method of any of embodiments 82 to 86, where the combining is performed on the first major surface of the first substrate.

Embodiment 88 is the method of any of embodiments 82 to 87, wherein the disposing includes spreading the mixture on the first major surface of the first substrate.

Embodiment 89 is a method of curing a two-part composition. The method includes (a) obtaining the two-part composition of any of embodiments 17 to 76; (b) combining at least a portion of the first part with at least a portion of the second part to form a mixture; and (c) subjecting the mixture to a temperature of 45° C. or higher to provide a polymerized reaction product of the mixture.

Embodiment 90 is the method of embodiment 89, further including disposing the mixture on a first major surface of a substrate prior to step (c).

EXAMPLES

Unless otherwise noted or readily apparent from the context, all parts, percentages, ratios, etc. in the Examples and the rest of the specification are by weight. Table 1, below, lists materials used in the examples and their sources.

TABLE 1

| DESIGNATION | DESCRIPTION | SOURCE |
|---|---|---|
| DN3400 | HDI-based oligomer with uretdione functional groups obtained as DESMODUR N3400 | Covestro, Leverkusen, Germany |
| 2-ethyl hexanol | 2-ethylhexanol | Alfa Aesar, Haverhill, Massachusetts |
| 2-BuOH | 2-butanol | Alfa Aesar |
| 1,3-BD | 1,3-butanediol | Alfa Aesar |
| NPG | 2,2-dimethyl-1,3-propanediol | Alfa Aesar |
| BiND | bismuth neodecanoate | Gelest, Morrisville, Pennsylvania |

TABLE 1-continued

Materials List

| DESIGNATION | DESCRIPTION | SOURCE |
|---|---|---|
| T1000 | Poly(tetramethylene ether) glycol with a molecular weight of 1000 g/mol obtained under the trade designation TERATHANE 1000 | Invista; Wichita, Kansas |
| T650 | Poly(tetramethylene ether) glycol with a molecular weight of 650 g/mol obtained under the trade designation TERATHANE 650 | Invista |
| EGE6 | 2-Ethylhexyl glycidyl ether obtained under the trade designation ERISYS GE-6 | Emerald Performance Materials |
| EGE20 | Neopentyl glycol diglycidyl ether obtained under the trade designation ERISYS GE-20 | Emerald Performance Materials |
| EGE31 | Triglycidyl ether of trimethylolethane obtained under the trade designation ERISYS GE-31 | Emerald Performance Materials |
| Epon 828 | BPA Epoxy solution | Hexion Inc. |
| JT403 | Trifunctional amine-terminated polyether obtained under the trade designation JEFFAMINE T-403 Polyetheramine | Huntsman Corporation, The Woodlands, Texas |
| JD230 | Difunctional amine-terminated polyether obtained under the trade designation JEFFAMINE D230 | Huntsman Corporation |
| TTD | 4,7,10-Trioxatridecane-1,13-diamine | Sigma-Aldrich |
| FR44 | Poly(butylene adipate) diol obtained under the trade designation FOMREZ 44-111 | Lanxess, Cologne, Germany |
| Isosorbide | D-Isosorbide | Alfa Aesar |
| THF 2900 | Poly(tetrahydrofuran), average Mn ~2,900, contains 300-500 ppm BHT as stabilizer, | Sigma Aldrich |
| APN-23-J | Latent hardener obtained under the trade designation AJICURE PN-23-J | Ajinomoto Co, Inc |
| TLC-100 | Latent hardener obtained under the trade designation TECHNICURE LC-100 | ACCI Specialty Materials |
| DICY | Latent hardener obtained under the trade designation AMICURE CG-1200G | Evonik Industries AG |

Test Methods

Overlap Shear Test Method

The performance of adhesives derived from uretdione polymeric material was determined using overlap shear tests. Aluminum coupons (25 millimeter (mm)×102 mm×1.6 mm) were sanded with 220 grit sandpaper and wiped with isopropanol and dried. The uretdione polymeric material, the thermally activatable amine curative, and the liquid amine were each added to a plastic cup and mixed at 2700-3500 revolutions per minute (RPM) for 45 seconds to 90 seconds using a speed mixer (DAC 150 FV SpeedMixer from FlackTek, Landrum, South Carolina). Catalyst was then added, and the mixture was mixed for at 2700-3500 RPM 15 to 30 seconds using a combination of hand mixing with a wood applicator stick and the speed mixer.

The mixture was then applied to a 25 mm×13 mm area on one end of the aluminum coupon, and two pieces of stainless steel wire (0.25 mm diameter) were placed in the resin to act as bondline spacers. One end of a second aluminum coupon was then pressed into to the mixture to produce an overlap of approximately 13 mm. For the examples evaluated in Table 6, a binder clip was then placed on the sample, and it was allowed to cure for the time specified at ambient temperature. For the samples prepared following method A, the samples were then tested after the time specified was completed. For samples prepared following method B, the samples were heated to 80° C. for 1 hour after curing at ambient temperature for the time specified, and allowed to cool to ambient temperature. For the examples evaluated in Table 7, the mixture was then applied to a 25 mm×13 mm area on one end of the aluminum coupon, and two pieces of stainless steel wire (0.25 mm diameter) were placed in the resin to act as bondline spacers. One end of a second aluminum coupon was then pressed into to the mixture to produce an overlap of approximately 13 mnn after the open time specified. The samples were tested to failure in shear mode at a rate of 2.54 mm/minute using a tensile load frame with self-tightening grips (MTS Systems, Eden Prairie, Minnesota). After failure, the length of the overlap area was measured. The overlap shear value was then calculated by dividing the peak load by the overlap area, to result in units of pounds per square inch (psi) or megapascals (MPa), and the average results of two replicates (unless otherwise noted) is reported. For instance, one sample is indicated by no standard deviation reported and three replicates are indicated by a symbol and footnote.

Ftir Characterization

The infrared (IR) spectra of the polymeric material samples and the cured adhesives were obtained using an infrared Fourier Transform spectrometer (NICOLET 6700 FT-IR Spectrometer, Thermo Scientific, Madison, Wisconsin) equipped with a Smart iTR Diamond Attenuated Total Reflectance (ATR) accessory. For all the polymeric materials the isocyanate peak at 2260 $cm^1$ was not present in the infrared spectrum, indicating that the isocyanate had reacted completely with the alcohols during the preparation of the polymeric materials. For all the polymeric materials, a strong uretdione signal at 1760 $cm^{-1}$ was observed. For all the cured adhesives, the uretdione signal at 1760 $cm_{-1}$ had nearly disappeared, indicating reaction of the uretdione group during the cure of the adhesives.

NMR ANALYSIS of DN3400

DN3400 was dissolved in deuterated dimethyl sulfoxide (DMSO) solvent. The 1H proton spectrum was taken with a 500 MHz NMR (AVANCE III 500 MHz spectrometer equipped with a broadband cryoprobe from Bruker, Billerica, Massachusetts). The resulting spectrum had 5 major signals. Signals at 1.31 parts per million (ppm) and 1.55 ppm were attributed to methylene groups at the 3 and 4 positions and the 2 and 5 positions of the HDI derivatives, respectively. A signal at 3.17 ppm was attributed to methylene protons adjacent to a uretdione group. A signal at 3.34 ppm was attributed to methylene protons adjacent to an isocyanate group. A signal at 3.74 ppm was attributed to methylene protons adjacent to an isocyanurate group. The integrations of these three methylene signals were 1.35, 1.79, and 0.49, respectively. The published values for DN3400 are an equivalent weight of isocyanate of 193 g/equivalent and 22 weight percent isocyanate. The ratio of the integration of the signal at 3.17 ppm over the integration of the signal at 3.34 ppm is 0.75, which corresponds to 16 wt. % uretdione. The ratio of the integration of the signal at 3.74 ppm over the integration of the signal at 3.34 ppm is 0.27, which corresponds to 3 wt. % isocyanurate. The functionality of DN3400 is published as 2.5 (in "Raw Materials for Automotive Refinish Systems" from Bayer Materials Science, 2005), so the average molecular weight of the molecule in DN3400 is 193 grams/equivalent ×2.5 equivalents/mole=482 grams/mol. For every 2.5 isocyanate methylene groups, there are 0.75*2.5=1.875 uretdione methylene groups. There are two methylene groups per uretdione group, so there are about 0.94 uretdione groups per molecule of DN3400.

Calculation of Uretdione Functionality in Polymeric Material

A modified Carothers equation relates degree of polymerization (DP) to the average functionality (fav) and conversion (p) in a step growth polymerization [Carothers, Wallace (1936). "Polymers and Polyfunctionality". Transactions of the Faraday Society. 32: 39-49]:

$$DP=2/(2-(p*fav))$$

This equation can be used to calculate the average degree of polymerization of each polymeric material. Based on the degree of polymerization, the average number of uretdione groups in the polymeric material (fUD) can be calculated by:

$$fUD=DP*(DN3400\ molecules)*(uretdione\ groups\ per\ DN3400\ molecule)/(total\ molecules)$$

where the values for "DN3400 molecules" and the "total molecules" correspond to the respective moles of molecules used to make the polymeric material, and the value for "uretdione groups per DN3400 molecule" is 0.94, as calculated based on the NMR data (above). It is shown below that polymeric materials with an average uretdione functionality between 0.94<(fUD)<5 in combination with a diluent produce reasonably good properties when cured.

General Polymeric Material Preparation

Bismuth neodecanoate, DN3400, the chain extender, and the capping group were added to a glass jar according to Tables 2, 3, and 4. The amounts of alcohol that were added correspond to the equivalent values in Tables 2, 3, and 4 (relative to the equivalents of isocyanate). The mixture was stirred magnetically at 700 revolutions per minute (RPM). Initially the mixture was hazy, and after about one minute, the mixture became clear and slightly warm. The mixture then continued to exotherm noticeably. Stirring was continued for a total of 5 minutes, and the polymeric material was then allowed to cool to room temperature.

TABLE 2

Polymeric Material Formulations

| | CAPPING GROUP | | | CHAIN EXTENDER | | | DN 3400 | BiND | Calculated Uretdione Functionality, |
|---|---|---|---|---|---|---|---|---|---|
| EXAMPLE | Type | g | Relative Equiv. | Type | g | Relative Equiv. | g | g | fUD |
| A1 | 2-BuOH | 0.90 | 0.63 | NPG | 0.3681 | 0.37 | 3.72 | 0.01 | 1.74 |
| A2 | 2-BuOH | 12.50 | 0.59 | FR44 | 41.300 | 0.41 | 55.4 | 0.15 | 1.94 |

TABLE 3

Polymeric Material Formulations

| | CAPPING GROUP | | | CHAIN EXTENDER 1 | | | CHAIN EXTENDER 2 | | | DN3400 | BiND | |
|---|---|---|---|---|---|---|---|---|---|---|---|---|
| EXAMPLE | Type | g | Relative Equiv. | Type | G | Relative Equiv. | Type | g | Relative Equiv. | g | g | fUD |
| B1 | 2-BuOH | 0.64 | 0.74 | NPG | 0.075 | 0.14 | 1,3-BD | 0.065 | 0.12 | 2.22 | 0.006 | 1.37 |
| B2 | 2-BuOH | 12.3 | 0.58 | isosorbide | 7.03 | 0.335 | THF 650 | 8.00 | 0.085 | 55.4 | 0.15 | 1.99 |
| B3 | 2-BuOH | 12.2 | 0.57 | NPG | 5.08 | 0.34 | THF 2900 | 35.8 | 0.09 | 55.4 | 0.15 | 2.01 |

TABLE 4

Polymeric Material Formulations

| | CAPPING GROUP 1 | | | CAPPING GROUP 2 | | | CHAIN EXTENDER | | | DN3400 | BiND | |
|---|---|---|---|---|---|---|---|---|---|---|---|---|
| EXAMPLE | Type | g | Relative Equiv. | Type | g | Relative Equiv. | Type | g | Relative Equiv. | g | g | fUD |
| C1 | 2-BuOH | 10.64 | 0.38 | 2-Ethyl Hexanol | 18.67 | 0.38 | NPG | 4.98 | 0.25 | 73.88 | 0.2 | 1.37 |

TABLE 5

Adhesive Formulations

| EXAMPLE | POLYMERIC MATERIAL Type | g | EPOXY Type | g | AMINE 1 Type | g | AMINE 2 Type | g |
|---|---|---|---|---|---|---|---|---|
| EX-1 | A1 | 3.00 | Epon 828 | 0.81 | Ajicure PN-23-J | 0.8 | JT403 | 0.69 |
| EX-2 | A1 | 5.00 | Epon 828 | 1.34 | Ajicure PN-23-J | 1.5 | JT403 | 0.92 |
| EX-3 | A1 | 5.00 | Epon 828 | 1.34 | Ajicure PN-23-J | 1.7 | JT403 | 0.76 |
| EX-4 | A1 | 5.00 | Epon 828 | 1.34 | Ajicure PN-23-J | 1.8 | JT403 | 0.65 |
| EX-5 | A1 | 5.00 | Epon 828 | 1.34 | Ajicure PN-23-J | 1.9 | JT403 | 0.57 |
| EX-6 | B3 | 5.00 | Epon 828 | 0.92 | Ajicure PN-23-J | 1.3 | JT403 | 0.45 |
| EX-7 | B2 | 5.00 | Epon 828 | 1.21 | Ajicure PN-23-J | 1.7 | JT403 | 0.59 |
| EX-8 | B1 | 5.00 | Epon 828 | 1.34 | Ajicure PN-23-J | 1.8 | JT403 | 0.65 |
| EX-9 | C1 | 5.00 | Epon 828 | 1.01 | Ajicure PN-23-J | 1.4 | JT403 | 0.49 |
| EX-10 | A2 | 5.00 | Epon 828 | 0.92 | Ajicure PN-23-J | 0.9 | JT403 | 0.78 |
| EX-11 | A1 | 5.00 | EGE31 | 1.14 | Ajicure PN-23-J | 1.5 | JD230 | 0.69 |
| EX-12 | A1 | 5.00 | EGE20 | 0.94 | Ajicure PN-23-J | 1.7 | JD230 | 0.57 |
| EX-13 | A1 | 5.00 | EGE6 | 1.57 | Ajicure PN-23-J | 1.8 | JD230 | 0.49 |
| EX-14 | A1 | 5.00 | Epon 828 | 1.34 | Ajicure PN-23-J | 1.9 | JD230 | 0.43 |
| EX-15 | A1 | 5.00 | Epon 828 | 1.34 | Ajicure PN-23-J | 1.3 | TTD | 0.79 |
| EX-16 | A1 | 5.00 | Epon 828 | 1.34 | Ajicure PN-23-J | 1.3 | A350a | 0.72 |
| EX-17 | A1 | 5.00 | | | Ajicure PN-23-J | 0.8 | JD230 | 0.34 |
| CEX-18 | Epon 828 | 5.00 | EGE20 | 5.00 | Ajicure PN-23-J | 7.7 | JD230 | 2.58 |
| CEX-19 | Epon 828 | 5.00 | | | Ajicure PN-23-J | 3.4 | JD230 | 0.91 |
| EX-20 | A1 | 5.00 | Epon 828 | 1.34 | Ajicure PN-23-J/DICY | 0.483/0.180 | JD230 | 0.32 |
| EX-21 | A1 | 5.00 | Epon 828 | 1.34 | TLC-80 | 1.3 | JD230 | 0.86 |
| EX-22 | A1 | 5.00 | Epon 828 | 1.34 | DICY | 0.1 | JD230 | 0.86 |
| EX-23 | A1 | 4.00 | EGE31 | 1.14 | Ajicure PN-23-J | 1.3 | JD230 | 0.70 |
| EX-24 | A1 | 4.00 | EGE20 | 0.38 | Ajicure PN-23-J | 0.8 | JD230 | 0.47 |
| EX-25 | A1 | 4.00 | Epon 828 | 1.61 | Ajicure PN-23-J | 1.4 | JD230 | 0.78 |
| EX-26 | A1 | 2.00 | Epon 828 | 2.69 | Ajicure PN-23-J | 1.7 | JD230 | 0.94 |
| EX-27 | A1 | 2.00 | Epon 828 | 5.38 | Ajicure PN-23-J | 2.8 | JD230 | 1.9 |
| EX-28 | A1 | 4.00 | Epon 828/EGE20 | 1.40/0.16 | Ajicure PN-23-J | 2.8 | JD230/G240 | 0.75/0.068 |

TABLE 6

Evaluation of Adhesive Performance over time

| EXAMPLE | Test Condition | 1 hour OLS, psi (average) | St Dev | 3 hours OLS, psi (MPa) | St Dev | 3 days OLS, psi (MPa) | St Dev | 7 days OLS, psi (MPa) | St Dev | 2-4 weeks OLS, psi (MPa) | St Dev |
|---|---|---|---|---|---|---|---|---|---|---|---|
| EX-1 | A† | 434 (3.0) | 297 (2.0) | NA | NA | NA | NA | NA | NA | NA | NA |
| EX-1 | B†† | 1570 (10.8) | 117 (0.8) | NA | NA | NA | NA | NA | NA | NA | NA |
| EX-2 | A | 16.3 (0.1) | 2.9 (0.02) | 178 (1.2) | 77.1 (0.5) | 409 (2.8) | 85.3 (0.6) | NA | NA | NA | NA |
| EX-2 | B | 1470 (10.1) | 210 (1.4) | 1540 (10.6) | 19.9 (0.1) | 1474 (10.2) | 168.7 (1.2) | NA | NA | NA | NA |
| EX-3 | A | 4.7 (0.03) | 5.9 (0.04) | 11.1 (0.1) | 9.4 (0.1) | 95.4 (0.6) | 44.0 (0.0) | NA | NA | NA | NA |
| EX-3 | B | 1903 (13.1) | NA | 1680 (11.6) | 95.6 (0.7) | 1603 (11.1) | NA | NA | NA | NA | NA |
| EX-4 | A | 6.5 (0.05) | 1.7 (0.01) | 8.0 (0.1) | 4.5 (0.05) | 91.8 (0.6) | 1.4 (0.0) | NA | NA | NA | NA |
| EX-4 | B | 1510 (10.4) | 305 (2.1) | 2120 (14.6) | NA | 2001 (13.8) | 143.5 (1.0) | NA | NA | NA | NA |
| EX-5 | A | 1.6 (0.01) | 1.0 (0.01) | NA | NA | 139.9 (1.0) | 11.2 (0.1) | 232.6 (1.6) | 1.9 (0.01) | NA | NA |
| EX-5 | B | 729 (5.0) | 246 (1.7) | NA | NA | 1067 (7.4) | 608 (4.2) | 1363 (9.4) | 476.3 (3.3) | NA | NA |
| EX-6 | A | NA | NA | 20.2 (0.1) | 5.6 (0.05) | 190.7 (1.3) | 35.0 (0.2) | 157.2 (1.1) | 71.0 (0.5) | NA | NA |
| EX-6 | B | NA | NA | 500 (3.4) | 200.7 (1.4) | 610.2 (4.2) | 119.8 (0.8) | 648.8 (4.5) | 205.0 (1.4) | NA | NA |
| EX-7 | A | NA | NA | 17.0 (0.1) | 5.7 (0.0) | 327.1 (2.3) | 186.4 (1.3) | 533.7 (3.7) | 55.1 (0.4) | NA | NA |
| EX-7 | B | NA | NA | 1980 (13.7) | 321 (2.2) | 1459 (10.1) | 283.7 (2.0) | 1532 (10.6) | 205.3 (1.4) | NA | NA |
| EX-7 | A* | 2.9 (0.02) | NA | NA | NA | 1069 (7.4) | 297.7 (2.1) | NA | NA | NA | NA |

TABLE 6-continued

Evaluation of Adhesive Performance over time

| | | 1 hour | | 3 hours | | 3 days | | 7 days | | 2-4 weeks | |
|---|---|---|---|---|---|---|---|---|---|---|---|
| EXAMPLE | Test Condition | OLS, psi (average) | St Dev | OLS, psi (MPa) | St Dev | OLS, psi (MPa) | St Dev | OLS, psi (MPa) | St Dev | OLS, psi (MPa) | St Dev |
| EX-7 | B* | 2265 (15.6) | 927 (6.4) | NA | NA | 2371 (16.3) | 37.5 (0.3) | NA | NA | NA | NA |
| EX-8 | A | NA | NA | 1.4 (0.0) | NA | 10.5 (0.1) | 0.2 (0.0) | 73.7 (0.5) | 63.8 (0.4) | NA | NA |
| EX-8 | B | NA | NA | 1137 (7.8) | 202.9 (1.4) | 1077 (7.4) | NA | 1046 (7.2) | 214.2 (1.5) | NA | NA |
| EX-9 | A | NA | NA | 1.3 (0.01) | 0.7 (0.0) | 2.4 (0.01) | 0.8 (0.0) | 1.5 (0.01) | 0.5 (0.00) | NA | NA |
| EX-9 | B | NA | NA | 1362 (9.4) | 475.4 (3.3) | 387.2 (2.7) | 312.8 (2.2) | 480.8 (3.3) | 35.9 (0.2) | NA | NA |
| EX-10 | A | NA | NA | 106.3 (0.7) | 64.8 (0.4) | 161.0 (1.1) | NA | 187.1 (1.3) | 52.4 (0.4) | NA | NA |
| EX-10 | B | NA | NA | 156.4 (1.1) | 14.7 (0.1) | 278.8 (1.9) | 70.4 (0.5) | 165.7 (1.1) | 31.4 (0.2) | NA | NA |
| EX-11 | A | NA | NA | 140.8 (1.0) | 8.6 (0.1) | 138.9 (1.0) | 56.4 (0.4) | 387.0 (2.7) | 178.2 (1.2) | 566 (3.9) | 53.7 (0.4) |
| EX-11 | B | NA | NA | 1921 (13.2) | 581.2 (4.0) | 1028 (7.1) | 2.1 (0.0) | 647.0 (4.5) | 131.5 (0.9) | 1044 (7.2) | 186 (1.3) |
| EX-12 | A | NA | NA | 68.5 (0.5) | 40.1 (0.3) | 86.0 (0.6) | 13.6 (0.1) | 134.0 (0.9) | 31.1 (0.2) | 301.5 (2.1) | 103.9 (0.7) |
| EX-12 | B | NA | NA | 1445 (10.0) | 318.9 (2.2) | 882.0 (6.1) | 67.9 (0.5) | 379.5 (2.6) | 55.9 (0.4) | 678.5 (4.7) | 160.5 (1.1) |
| EX-13 | A | NA | NA | 2.1 (0.02) | 1.3 (0.01) | 26.6 (0.2) | 23.5 (0.2) | 79.0 (0.5) | 8.5 (0.1) | 82.0 (0.6) | 49.5 (0.3) |
| EX-13 | B | NA | NA | 156.5 (1.1) | 3.5 (0.02) | 591.5 (4.1) | | 185.0 (1.3) | 28.3 (0.2) | 154.0 (1.1) | 24.0 (0.2) |
| EX-14 | A | NA | NA | 3.0 (0.02) | 1.4 (0.01) | 63.6 (0.4) | 5.1 (0.0) | 257.0 (1.8) | 99.0 (0.7) | 130.5 (0.9) | 118.1 (0.8) |
| EX-14 | B | NA | NA | 815.5 (5.6) | 166.2 (1.1) | 1190 (8.2) | 562.1 (3.9) | 1361 (9.4) | 87.0 0.60 | 983.5 (6.8) | 109.6 (0.8) |
| EX-15 | A | Cured too quickly to make samples | NA | NA | NA | NA | NA | NA | NA | NA | NA |
| EX-15 | B | NA | NA | NA | NA | NA | NA | NA | NA | NA | NA |
| EX-16 | A | NA | NA | 5.4 (0.04) | 0.5 (0.00) | NA | NA | NA | NA | NA | NA |
| EX-16 | B | NA | NA | 1353 (9.3) | 237.6 (1.6) | NA | NA | NA | NA | 1693 (11.7) | NA |
| EX-17 | A | 4.9 (0.03) | 0.2 (0.001) | 13.3 (0.1) | 3.7 (0.02) | 175.5 (1.2) | 79.9 (0.6) | 146.0 (1.0) | 166.9 (1.2) | NA | NA |
| EX-17 | B | 1200 (8.3) | 38.9 (0.3) | 1225 (8.4) | 384.7 (2.7) | 1270 (8.8) | 256.7 (1.8) | 893.5 (6.2) | 123.7 (0.9) | NA | NA |
| CEX-18 | A | Did not make adequate sample for testing | | Did not make adequate sample for testing | | 1310.5 (9.0) | 549.4 (3.8) | 2637.5 (18.2) | 159.1 (1.1) | NA | NA |
| CEX-18 | B | 1379 (9.5) | 103.2 (0.7) | 1491 (10.3) | 48.8 (0.3) | 2054.0 (14.2) | 59.4 (0.4) | 2167.5 (14.9) | 290.6 (2.0) | NA | NA |
| CEX-19 | A | Did not make adequate sample for testing | | Did not make adequate sample for testing | | 412.5 (2.8) | 16.3 (0.1) | 521.0 (3.6) | 93.3 (0.6) | NA | NA |
| CEX-19 | B | 1257 (8.7) | 10.6 (0.07) | 1049 (7.2) | 214.3 (1.5) | 1129 (7.8) | 446.2 (3.1) | 999.5 (6.9) | 71.4 (0.5) | NA | NA |
| EX-20 | A | Did not make adequate sample for testing | | 2.5 (0.02) | 0.8 (0.01) | 137.0 (0.9) | 155.5 (1.1) | 172.0 (1.2) | 233.3 (1.6) | NA | NA |
| EX-20 | B | 740.5 (5.1) | 143.5 (1.0) | 1407 (9.7) | 285.7 (2.0) | 258.0 (1.8) | 117.4 (0.8) | 229.5 (1.6) | 16.3 (0.1) | NA | NA |
| EX-21 | A | 6.4 (0.04) | 0.9 (0.01) | 107.5 (0.7) | 10.4 (0.1) | 1457 (10.0) | 140.7 (1.0) | 2120 (14.6) | 107.5 (0.7) | NA | NA |
| EX-21 | B | 2806 (19.3) | 345.1 (2.4) | 2716 (18.7) | 1.4 (0.01) | 2786 (19.2) | 225.6 (1.6) | 2264 (15.6) | 29.7 (0.2) | NA | NA |
| EX-22 | A | 12.6 (0.09) | 2.6 (0.02) | 31.4 (0.2) | 7.1 (0.01) | 633.5 (4.4) | 193.0 (1.3) | 1233 (8.5) | 307.6 (2.1) | NA | NA |
| EX-22 | B | 1180 (8.1) | 48.1 (0.3) | 1386 (9.6) | 8.5 (0.01) | 1334 (9.2) | 123.0 (0.8) | 674.5 (4.7) | 600.3 (4.1) | NA | NA |
| EX-23 | A | NA | NA | 26.2 (0.2) | 3.4 (0.02) | 158.2 (1.1) | 3.7 (0.0) | NA | NA | 447.6 (3.1) | 192.9 (1.3) |
| EX-23 | B | NA | NA | 313.7 (2.2) | 64.1 (0.4) | 288.7 (2.0) | 117.4 (0.8) | NA | NA | 572.7 (3.9) | 27.8 (0.2) |
| EX-24 | A | NA | NA | 32.1 (0.2) | 21.5 (0.1) | 219.5 (1.5) | 98.4 (0.7) | NA | NA | 156.0 (1.1) | 17.8 (0.1) |

TABLE 6-continued

Evaluation of Adhesive Performance over time

| | | 1 hour | | 3 hours | | 3 days | | 7 days | | 2-4 weeks | |
|---|---|---|---|---|---|---|---|---|---|---|---|
| EXAMPLE | Test Condition | OLS, psi (average) | St Dev | OLS, psi (MPa) | St Dev | OLS, psi (MPa) | St Dev | OLS, psi (MPa) | St Dev | OLS, psi (MPa) | St Dev |
| EX-24 | B | NA | NA | 592.1 (4.1) | 125.1 (0.9) | 209.7 (1.4) | 35.2 (0.2) | NA | NA | 340.6 (2.3) | 13.0 (0.1) |
| EX-25 | A | NA | NA | 9.0 (0.1) | 0.9 (0.01) | 821.7 (5.7) | 107.6 (0.7) | NA | NA | 1618 (11.2) | 418.9 (2.9) |
| EX-25 | B | NA | NA | 832.8 (5.7) | 715.6 (4.9) | 1663 (11.5) | 233.7 (1.6) | NA | NA | 2013.2 (13.9) | 422.4 (2.9) |
| EX-26 | A | NA | NA | Did not make adequate sample for testing | | 1710.3 (11.8) | 906.9 (6.3) | NA | NA | NA | 27.7 (0.2) |
| EX-26 | B | NA | NA | 1663 (11.5) | 303.1 (2.1) | 2237 (15.4) | 696.0 (4.8) | NA | NA | 1811 (12.5) | 721.7 (5.0) |
| EX-27 | A | NA | NA | Did not make adequate sample for testing | | 961.5 (6.6) | 485.0 (3.3) | NA | NA | NA | 252.2 (1.7) |
| EX-27 | B | NA | NA | 2287 (15.8) | 97.5 (0.7) | 1667 (11.5) | 72.0 (0.5) | NA | NA | 1975 (13.6) | 442.0 (3.0) |
| EX-28 | A | NA | NA | 3.5 (0.02) | 0.8 (0.00) | 828.7 (5.7) | 151.5 (1.0) | NA | NA | 1436 (9.9) | 471.4 (3.3) |
| EX-28 | B | NA | NA | 754.9 (5.2) | 151.1 (1.0) | 1007 (6.9) | 117.8 (0.8) | NA | NA | 1831 (12.6) | 546.8 (3.8) |

†Test Condition A: Tested after set time specified
††Test Condition B: Heated for 1 hour at 80° C. after aging at time specified.
*Latent catalyst added to Amine side of formulation

TABLE 7

Evaluation of open time on Adhesive Performance for EX-5

| Open Time, minutes | OLS, psi (MPa) | Std Dev, psi (MPa) |
|---|---|---|
| 2 | 1024 (7.06) | NA |
| 5 | 1569 (10.8) | NA |
| 15 | 1643 (11.3) | NA |
| 60 | 1313 (9.05) | NA |
| 120 | 1081 (7.45) | 7.7 (0.05) |
| 240‡ | 1224 (8.44) | 69.1 (0.48) |
| 1200‡ | 818 (5.63) | 149.4 (1.03) |
| 10080‡ | 376 (2.58) | 38.6 (0.27) |

‡Three OLS replicates were completed instead of two

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A polymeric material comprising:
a polymerized reaction product of a polymerizable composition comprising components, the components comprising:
(a) a uretdione-containing material comprising a reaction product of a diisocyanate reacted with itself;
(b) a first hydroxyl-containing compound having more than one OH group; and
(c) an optional second hydroxyl-containing compound having a single OH group, wherein the second hydroxyl-containing compound is a primary alcohol or a secondary alcohol; and
a thermally activatable amine curative, at least one molecule of the thermally activatable amine curative having an average amine functionality of 2.0 or greater;
wherein the polymeric material has an average uretdione ring functionality of at least 1.2, wherein the polymeric material is in the form of a liquid at 24 degrees Celsius, wherein the polymeric material contains 2% by weight or less of isocyanate groups, and wherein the polymeric material comprises a solids content of 90% or greater.

2. The polymeric material of claim 1, further comprising an acidic stabilizer.

3. The polymeric material of claim 1, further comprising an accelerator comprising a catalyst for reacting the uretdione-containing material with the first-hydroxyl-containing compound and, if present, with the second hydroxyl-containing compound.

4. The polymeric material of claim 1, further comprising an epoxy component.

5. A two-part composition comprising:
(1) a first part comprising a polymeric material comprising:
(a) a polymerized reaction product of a polymerizable composition comprising components, the components comprising:
(i) a uretdione-containing material comprising a reaction product of a diisocyanate reacted with itself;
(ii) a first hydroxyl-containing compound having more than one OH group; and
(iii) an optional second hydroxyl-containing compound having a single OH group, wherein the second hydroxyl-containing compound is a primary alcohol or a secondary alcohol; and (b) an optional thermally activatable amine curative;

wherein the polymeric material has an average uretdione ring functionality of at least 1.2, wherein the polymeric material contains 2% by weight or less of isocyanate groups, and wherein the polymeric material comprises a solids content of 90% or greater and (2) a second part comprising:

(a) at least one liquid amine, at least one molecule of the at least one liquid amine having an average amine functionality of 2.0 or greater, wherein each amine of the at least one liquid amine comprises a primary amine or a secondary amine; and (b) an optional thermally activatable amine curative;

wherein the thermally activatable amine curative is present in at least one of the first part or the second part and wherein at least one molecule of the thermally activatable amine curative has an average amine functionality of 2.0 or greater.

6. The two-part composition of claim 5, wherein at least one amine of the at least one liquid amine comprises a primary amine.

7. The two-part composition of claim 5, wherein at least one of the first part or the second part further comprises an accelerator comprising a catalyst.

8. The two-part composition of claim 7, wherein the accelerator is present in the first part and comprises a catalyst for reacting the uretdione-containing material with the first-hydroxyl-containing compound and, if present, with the second hydroxyl-containing compound.

9. The two-part composition of claim 5, wherein the uretdione-containing material is present in an amount of 10% by weight or greater, 20% by weight or greater, 30% by weight or greater, 40% by weight or greater, or 50% by weight or greater, based on the total weight of the polymeric material.

10. The two-part composition of claim 5, wherein the thermally activatable amine curative is present in the first part in an amount of 0.5 to 30% by weight, based on the total weight of the polymeric material.

11. The two-part composition of claim 5, wherein the first part further comprises an epoxy component.

12. The two-part composition of claim 5, wherein the first part is in the form of a liquid.

13. A polymerized product of the two-part composition of claim 5.

14. The polymerized product of claim 13, wherein the polymerized product coats at least a portion of a substrate.

15. A method of adhering two substrates together, the method comprising:

(a) obtaining the two-part composition of claim 5;

(b) combining at least a portion of the first part with at least a portion of the second part to form a mixture;

(c) disposing at least a portion of the mixture on a first major surface of a first substrate; and (d) contacting a first major surface of a second substrate with the mixture disposed on the first substrate.

16. A method of curing a two-part composition comprising:

(a) obtaining the two-part composition of claim 5;

(b) combining at least a portion of the first part with at least a portion of the second part to form a mixture; and (c) subjecting the mixture to a temperature of 45° C. or higher to provide a polymerized reaction product of the mixture.

* * * * *